United States Patent
Beck et al.

(10) Patent No.: US 8,316,128 B2
(45) Date of Patent: Nov. 20, 2012

(54) METHODS AND SYSTEM FOR CREATING AND MANAGING IDENTITY ORIENTED NETWORKED COMMUNICATION

(75) Inventors: Christopher Clemmett Macleod Beck, Carlsbad, CA (US); Mark Franklin Sidell, Chapel Hill, NC (US); Thomas Knox Gold, La Mesa, CA (US); James Karl Powers, Carlsbad, CA (US); Charles Dazler Knuff, Palomar Mountain, CA (US)

(73) Assignee: Forte Internet Software, Inc., Carlsbad, CA (US)

( * ) Notice: Subject to any disclaimer, the term of this patent is extended or adjusted under 35 U.S.C. 154(b) by 1091 days.

(21) Appl. No.: 10/765,338

(22) Filed: Jan. 26, 2004

(65) Prior Publication Data

US 2005/0198125 A1 Sep. 8, 2005

(51) Int. Cl.
*G06F 15/173* (2006.01)
(52) U.S. Cl. ......... 709/226; 709/204; 709/223; 709/224
(58) Field of Classification Search .................. 709/226, 709/204, 206, 223, 224
See application file for complete search history.

(56) References Cited

U.S. PATENT DOCUMENTS

| | | | | |
|---|---|---|---|---|
| 6,064,973 A * | 5/2000 | Smith et al. | .................. | 705/7.26 |
| 6,345,309 B2 * | 2/2002 | Ohsawa et al. | ............... | 709/250 |
| 6,374,290 B1 * | 4/2002 | Scharber et al. | ............. | 709/205 |
| 6,389,467 B1 | 5/2002 | Eyal | | |
| 6,401,122 B1 * | 6/2002 | Matsui et al. | .................. | 709/227 |
| 6,502,131 B1 * | 12/2002 | Vaid et al. | ...................... | 709/224 |
| 6,535,492 B2 * | 3/2003 | Shtivelman | .................... | 370/270 |
| 6,539,396 B1 * | 3/2003 | Bowman-Amuah | .......... | 707/769 |
| 6,549,922 B1 * | 4/2003 | Srivastava et al. | ..................... | 1/1 |
| 6,560,222 B1 * | 5/2003 | Pounds et al. | ................ | 370/353 |
| 6,594,673 B1 * | 7/2003 | Smith et al. | ........................... | 1/1 |
| 6,601,234 B1 * | 7/2003 | Bowman-Amuah | .......... | 717/108 |
| 6,901,594 B1 * | 5/2005 | Cain et al. | ...................... | 719/310 |
| 6,917,962 B1 * | 7/2005 | Cannata et al. | ............... | 709/204 |
| 6,934,748 B1 * | 8/2005 | Louviere et al. | ............... | 709/224 |
| 7,069,308 B2 | 6/2006 | Abrams | | |

(Continued)

FOREIGN PATENT DOCUMENTS

EP 1043671 A 10/2000

(Continued)

OTHER PUBLICATIONS

Fraser, Simon. "MT-NW Manual". Archived by the Internet Archive on Feb. 23, 2002: <http://webarchive.org/web/20020223141512/www.smfr.org/mtnw/docs/ToC_Normal.html>. pp. 1-208.*

*Primary Examiner* — Djenane Bayard
*Assistant Examiner* — Umar Cheema
(74) *Attorney, Agent, or Firm* — Donald R. Boys; Central Coast Patent Agency, Inc.

(57) ABSTRACT

A software application for managing routing of communiqués across one or more communication channels supported by a data-packet-network includes one or more workspaces for segregating communication activity; one or more unique user identities assigned per workspace; and one or more contact identities assigned to and approved to communicate with a workspace administrator of the one or more workspaces using the assigned user identities. In a preferred embodiment the application enforces a policy implicitly defined by the existing architecture of the workspaces and associated user and contact identities.

22 Claims, 13 Drawing Sheets

U.S. PATENT DOCUMENTS

| | | | | |
|---|---|---|---|---|
| 7,082,464 B2* | 7/2006 | Hasan et al. | | 709/223 |
| 7,200,662 B2* | 4/2007 | Hasan et al. | | 709/226 |
| 7,308,497 B2* | 12/2007 | Louviere et al. | | 709/224 |
| 7,546,629 B2* | 6/2009 | Albert et al. | | 726/1 |
| 2002/0049738 A1* | 4/2002 | Epstein | | 707/1 |
| 2002/0060988 A1* | 5/2002 | Shtivelman | | 370/259 |
| 2002/0073210 A1* | 6/2002 | Low et al. | | 709/228 |
| 2002/0138571 A1* | 9/2002 | Trinon et al. | | 709/204 |
| 2003/0021283 A1* | 1/2003 | See et al. | | 370/401 |
| 2003/0078985 A1* | 4/2003 | Holbrook et al. | | 709/213 |
| 2003/0110262 A1* | 6/2003 | Hasan et al. | | 709/226 |
| 2004/0064351 A1* | 4/2004 | Mikurak | | 705/7 |
| 2004/0068471 A1* | 4/2004 | Kato | | 705/51 |
| 2004/0215630 A1* | 10/2004 | Parekh et al. | | 707/100 |
| 2005/0198305 A1* | 9/2005 | Pezaris et al. | | 709/227 |
| 2005/0257159 A1* | 11/2005 | Keohane et al. | | 715/752 |

FOREIGN PATENT DOCUMENTS

WO    2004043029 A    5/2004

* cited by examiner

*Fig. 3 (ER diagram zone structure)*

Fig. 11 (Zone Host Architecture)

Fig. 12 (software layers/components)

METHODS AND SYSTEM FOR CREATING AND MANAGING IDENTITY ORIENTED NETWORKED COMMUNICATION

FIELD OF THE INVENTION

The present invention is in the field of network-based communications including digital transactions and file transfers and pertains particularly to methods and apparatus for managing communications including file transfers and file acquisitions based on user and contact identity information.

BACKGROUND OF THE INVENTION

With the advent and development of the Internet network, including the World Wide Web and other connected sub-networks; the network interaction experience has been continually enriched over the years and much development continues. In a large part, network users, both veteran and novice have a basic human commonality in that they all share three basic desires that materialize into behavioral traits when engaging in network-enhanced interaction. These behavioral traits are the desire for communication with others, the desire to collect and/or acquire digital content, and the desire to collaborate with others to help solve some problem or to resolve an issue. As behavioral traits, these basic needs can be expanded into many sub-categories. Communication includes interaction over channels such as Instant Messaging (IM), email, posting boards, chat, voice over Internet protocol (VoIP), analog voice, etc. Collection includes collecting art, knowledge, music, photographs, software, news, and so on. Collaboration includes group discussions, task fulfillment, and any other collective efforts to solve a problem or perform a function. In basic form communication, collection, and collaboration are very tightly intertwined as basic desires.

As practices many users may unequally engage in the just-mentioned behaviors. For example, virtually all network users have active email accounts and active Instant Messaging capabilities. Most users have IP telephony capabilities and networking collaboration capabilities, at least installed on their computer systems if not actively configured for use. Many users have peer-to-peer file sharing capabilities, often coupled with communication capabilities. General communication may arguably be the most dominant network practice, followed by collection and sharing of content and network collaboration not necessarily in the stated order.

To further illustrate the imbalance of the three core behaviors for any one user consider that some users engage heavily in instant messaging, voice and, or email correspondence, while almost never engaging in file transfers or content downloading. Others engage more heavily in collaboration while lightly engaged in file transfer, content download, and common or casual communication. Still others practice content downloading and file sharing more often than collaboration. One can readily attest that it is difficult to practice one behavior exclusively without also practicing the others to some extent.

Software providers have long recognized the need to fulfill these basic desires by providing the capabilities in a single interface and have provided many well-known communication applications that provide access to casual and business communication as well as collaboration and file transfer capabilities. Programs like Net-Meeting™ and ICQ™, among many others attempt to aggregate these capabilities into a single accessible interface some times integrating separate communications applications for single point launching.

Users generally belong to a variety of communities and organizations that may or may not be tightly structured or organized. For example, a user may have family and friends in their on-line address book along with work associates from the job (two communities that should be separated). The same user may belong to a church group and a golf group, or some other sports group. The same user may also volunteer at a wildlife rehabilitation center. However loosely formed and organized, these separate groups often have a central Web presence, for example, a Web site, posting board, or the like. Likewise many of the group members or associates also have individual on-line capabilities like ISP accounts, email addresses and so on.

A user associated with more than one group logically has varying personas or faces that he or she presents to each group. Moreover, the user may logically be willing to share only varying degrees and depth of information with these separate groups largely restricted to the subject matter(s) appropriate to the group. For example, the user's family members and close friends would not share the same type and depth of information as the user's work associates, or the user's wildlife rehab associates. It may be desired by a user, and in fact is logical to conclude that in association with these different groups that group boundaries should be respected with reference to communication channels and formal as well as informal information sharing.

A drawback to virtually all of the available communication channels whether they are separate channels or integrated into a communication application, is that a user may have to provide a basic permanent identity and profile for these programs to work successfully. For example, an email account generally requires a permanent email address that the user may have to maintain unless the account is to be abandoned. Using more than one email address generally requires more than one email account for a given user. Likewise instant message applications may require a standard email account and identity.

Collaborative tools for business like IP telephone, white boarding, and file transfer services similarly boil down to a single user identity, most likely one he or she uses for most communication channels. Therefore, a user wishing to establish boundaries between different activities associated with different groups in a social architecture generally has a daunting organization task of managing communication methods and channels between different members of different groups as well as manually separating contacts within one or more address books or contact lists. It is extremely likely that many times information that was for one group inadvertently becomes available to another group such as an email address and profile or some file or attachment. Communication channels for each group become blurred and any established boundaries between groups tend to deteriorate over time.

One mechanism for enabling users to communicate, collaborate, and collect digital content is the well-known Usenet convention. Usenet is a collection of user-submitted notes or messages about various subjects posted to loosely organized servers known as news servers. News servers can be Internet-hosted or hosted on a sub-network accessible through the Internet. These servers operate according to a network protocol termed network News Transfer Protocol or NNTP. Users of Usenet use software applications known as newsreaders that are adapted to enable a user to subscribe to one or more of many hundreds or even thousands of available news groups for the purpose of reading messages posted by other users and posting messages for others to read. Subject matter available for access in a news server is loosely organized under different topics or subjects, referred to collectively as newsgroups.

Therefore, for any given newsgroup, there will be hundreds if not thousands of ongoing interactions loosely organized according to a post/response format threading of message headers, posted messages, and posted replies.

In some cases newsgroups are moderated so that the headings and posted messages are somewhat in-line with the topic of the group and unwanted content is edited out. A great many newsgroups are completely un-moderated and anonymous. In these groups a user can post any type of message that he or she desires. Whether or not the posting actually fits the general topic is immaterial. Of course, any conceivable topic may be fodder for a newsgroup. Many companies offer moderated newsgroups that cater to their clients or customers wherein the subject matters for the groups are about their offered products. In these types of groups, users often collaborate with each other to resolve problems or issues.

More recently, news servers have become repositories for storing binary content in the form of picture files, movie files, game files and other downloadable content. Collectors often subscribe to specific newsgroups through which content that the user wants to collect is posted. While formerly used more for communication and collaboration, Usenet is now used more and more for collection and sharing of binary files and HTTP links to binary files.

As Usenet has evolved over the years, so has the software that enables users to partake in the experience. Although most Web browsers and email clients support Usenet, there are especially dedicated programs that enable more efficient sampling, subscribing and manipulation of content from Usenet. The inventors have developed a particular newsreader known in the market as the Agent reader. The Agent reader allows conventional Usenet practices of newsgroup sampling through header sampling; finding and subscribing to newsgroups; finding and subscribing to free newsgroups; posting of messages to newsgroups after subscribing or to free groups; download of binaries; posting of binaries; integration with point-of-presence (POP) and Simple Message Transfer Protocol (SMTP) email accounts. Agent™ also provides database conventions for managing and archiving retrieved content and a search convention for finding specific content within any particular newsgroup.

Evolution of Usenet to a more media-heavy, digital collection environment has also invited more undesirable content encountered in the way of Spam messaging, unwanted pop-ups and the like wherein the content matter of the message or binary has nothing even remotely to do with a particular newsgroup topic. In some cases sampling 50 headers of a group returns mostly junk messages that are not topically aligned to the group subject matter. Still, the popularity of Usenet has increased with many attracted to its relative anonymity and loose organization.

Communication, collaboration, and collection behaviors are all possible and practiced currently with reference to many programs already mentioned above including newsreaders, peer-to-peer applications, chat software programs, some email clients, and so on. Many users of these applications become overwhelmed when receiving great numbers of messages, sorting through huge address books for contacts, and trying to regulate and manage contacts and downloaded messages and attached files. Most conventions for sorting and filing messages are manual conventions. In other words a user most often than not has to physically create file folders, if those in a list are not sufficient, and manually select and move messages and other content into them.

Another drawback in prior-art is that virtually all available applications for communication, collaboration, and collection focus mainly on content management to protect against Spam messages, undesirable downloads or attachments, and other unwanted messages. Content management is handled through user-configured or regulated filters that sort messages, for example, and eliminate those messages found to fit the filter description. Some applications allow you to block messages sent from certain senders based on the sender's identity through a user-created block list or ignore list. Generally speaking though, users must exert much time, effort, and patience to manually configure one or most often more than one application to manage content.

Many businesses use a plurality of identities when sending messages to users through email for example. A particular entity may have several different identities relating to differing departments of service, some of which the user would rather not receive messages from. Because the user has a permanent identity when dealing with other on-line entities, his or her identity information and, in some cases behavioral information gets aggregated and sold to other businesses who then begin spamming the user with emails, instant message pop-ups, even faxes and telephone calls if the information is known to them.

As previously described, when messages abound in all groups subscribed to and created by any user, the tasks of managing those messages according to which group, which address book, which contact list, which download folder, and so on becomes rather arduous. Most automated mechanisms for management of messages are task intensive and difficult to understand and configure. Lack of understanding complex management tasks that depend on multiple created rules for success renders a user in a state of constant distraction when the number of rules and tasks become more numerous. A user facing many configuration tasks for content and messaging management for more than one medium is more likely than not to revert to manual threadbare techniques.

It has occurred to the inventors that in an interface supporting messaging communication, collaboration, and content collection an architecture focused more on message management through user and sender identities would be a far more efficient tool set than what is currently available in the art.

Digital collectors also collaborate and communicate to try and locate specific content and to share content with specific others. In the case of Usenet, content authors may be largely anonymous however they do publish their Usenet identities so that other users can respond to them and communicate or collaborate with them. For the most part digital collection in Usenet and other applications is not organized in the sense that a user gets what he or she downloads. In many cases, especially in Usenet environments, there may or may not be thumbnails to sample for picture files or for movie snippets as part of a series description. Moreover descriptions of content depend on the perception of the poster or author and are more likely than not limited to only a few descriptive words or phrases.

Digital collections in Usenet comprise basically postings of a series of binary files, for example, a series of pictures, a movie that may be split-up into a series of short clips, or a software utility or game that is posted as a series of downloads split from the whole by a file splitter and compression application such as WinRAR. In many cases there are re-posts of content that is missing some of its pieces or files. A program known as SmartPAR is sometimes used to provide recovery of missing RAR files of a series. Also, there may be different quality versions of a posted series authored by different Posters. In this case it is desirable to be able to locate the best quality version, or the version that may be compatible with a specific user platform or digital player or viewer. Bandwidth and time spent on-line are also issues to contend with. It would be desirable to be able to locate through identity and enhanced content sampling the best digital content from a particular newsgroup without spending a lot of time and bandwidth downloading.

Music finder and picture finder applications are available in most readers, but they simply point out the existence of a jpeg or movie file or series. It would be desirable to be able to sample content by locating rich content description elements that fully describe a series and individual elements of a series. Moreover, applying identity management to the task of searching for content can enable a user to locate content based on similar identity profile information between poster and user.

One object of the present invention is to provide a user friendly interface for Usenet and other communication channels that will enable a user to manage multiple identities in a way that a correct identity and, in some cases profile is presented when the user is engaged in an interaction within an environment or specific channel that the user approves of for the use of a particular identity. Another object of the present invention is to provide a mechanism for managing incoming communiqués and user contacts based on identities in a way that automatically organizes and prioritizes incoming messages and contact lists according to user approved environments and communication channels.

Yet another object of the present invention is to provide a mechanism for managing workflow tasks in coordination with active identities and user environments. Still another object of the present invention is to provide an enhanced content collection experience wherein binary content can be sampled in a more granular and enriched fashion based on author intent and can reflect style and character that can be disseminated by the collector efficiently before accepting or downloading the content.

Therefore, what is clearly needed in the art is an enhanced identity oriented communication, collaboration, and enhanced digital collection platform that will manage content, contacts, and communication-based tasks according to preferred user environments, activities, and identities. A platform such as this will perform management duties in the background while the user can concentrate on immediate communication, collaboration, and collection activities. Such a platform will enrich interaction between users and other network-based entities without compromising user-pertinent information for un-solicited use by certain entities.

SUMMARY OF THE INVENTION

The inventor provides a software application for managing routing of communiqués across one or more communication channels supported by a data-packet-network. The application includes one or more workspaces for segregating communication activity; one or more unique user identities assigned per workspace; and one or more contact identities assigned to and approved to communicate with a workspace administrator of the one or more workspaces using the assigned user identities. In a preferred embodiment the application enforces a policy implicitly defined by the existing architecture of the workspaces and associated user and contact identities.

In one embodiment the supporting data-packet-network is the Internet network and the one or more workspaces are created zones segregated primarily by genre. In this embodiment a user identity relates to a workspace in terms of a supported communication channel. Also in this embodiment the one or more contact identities include one or more user identities of other users also using an instance of the software application.

In a preferred embodiment the zones define user communication parameters for various social environments known to and engaged upon by the user. In this embodiment the routing of a communiqué to a particular workspace is managed by contact identity and user identity pairing, the identities applicable to the supported communication channel used in communication.

In one embodiment of the invention the communication channels include email, instant messaging, RSS, and voice channels. In this embodiment the voice channels include voice over Internet protocol and voicemail messages. Also in one embodiment a user identity is one of an email address, a telephone number, a machine address, an IP address, or an Enum address particular to the administrator for a particular workspace and communication channel. In one embodiment of the invention the application may include user alerts generated according to violations of policy.

In a preferred embodiment workspaces include at least one inbox for accepting incoming communiqués. In this embodiment workspaces may also include at least one file folder for holding certain content. The certain content may include newsletters received from news groups. In another embodiment content may include binary files collected from a news server.

In a preferred embodiment of the invention the communiqués include one or a combination of email messages, voice messages, instant messages, facsimiles, newsletters, chat invitations, instant message invitations, and RSS feeds. In one embodiment one or more user identities per workspace are temporary identities created for correspondence and expiring when no longer needed for correspondence.

According to another embodiment of the present invention a firewall is provided for directing handling of communiqués of multiple media types transmitted to a single interface over a data-packet-network according to detected identity information associated with corresponding parties involved. The firewall may include an identity analyzer for analyzing and validating the identities detected; and a directory manager for managing validated identities for future reference. In this embodiment communiqués received at the interface having a sender and a user identification validated as a recognized identity pair are filed in one or more separate workspaces that support the identities detected and validated.

In a preferred embodiment the data-packet-network is the Internet network and the one or more workspaces are created zones segregated primarily by genre. In this embodiment an identity is one of a sender identity or a user identity and an identity pair is indicated by the existence of at least one of each for a communiqué.

In one embodiment of the present invention the firewall includes a content analyzer for searching content and or attachments of a communiqué for information leading to identification and validation of the sender if the identity analyzer does not detect correct sender identity. In one embodiment the firewall further includes policy violation alerts, which are generated if identity paring cannot be accomplished for a communiqué.

According to yet another embodiment of the present invention a method for routing communiqués received at a single interface according to identity information and workspace category is provided including steps (a) creating one or more workspaces to segregate communication; (b) creating one or more user identities for each created workspace; (c) assigning contact identities to certain ones of the created workspaces authorizing those contacts for communication using the workspace; (d) receiving a communiqué; (e) determining the sender and user identities of the communiqué; and (f) filing the communiqué into the appropriate workspace supporting the detected identities.

According to one embodiment the single interface is a third-party server. In a preferred embodiment the methods are practiced over the Internet network. In another embodiment with respect to (a) the one or more workspaces are zones administered by a user or a user group. In this embodiment the zones may reflect social or business environments known to and engaged upon by the user.

In a preferred embodiment with respect to (b) the user identities are related to communication channels by contact information. In a variation of this embodiment some of the user identities are temporary ad hoc identities.

In a preferred embodiment with respect to (c) the contact identities relate to contact parameters of appropriate media types. In this embodiment some contact identities can be applied to more than one workspace. Also in a preferred embodiment with respect to (a) creating a workspace includes creation of one or more inboxes and one or more additional file folders. Also in this embodiment with respect to (d) the communiqué is one of an email, an instant message, a voice call, a voice message, a chat request, a facsimile, or a file transfer.

In one embodiment with respect to (d) the communiqué is handled by a media handler according to media type. In still another embodiment a third party hosting service receives the communiqué.

In a preferred application with respect to (e) the determination is conducted by an identity analyzer as part of a firewall application. In a variant of this application content analysis is used to help determine the sender identity of the communiqué. Also in this preferred application with respect to (f) a firewall application orders inbound and outbound routing according to identity pairing, the detected pair comprising the sender identity and the user identity.

BRIEF DESCRIPTION OF THE DRAWING FIGURES

DESCRIPTION OF THE PREFERRED EMBODIMENTS

According to a preferred embodiment of the present invention, a software suite is provided for managing network communication and digital collection activities according to user and contact identities. The methods and apparatus of the present invention are described in enabling detail below.

Figure 1:
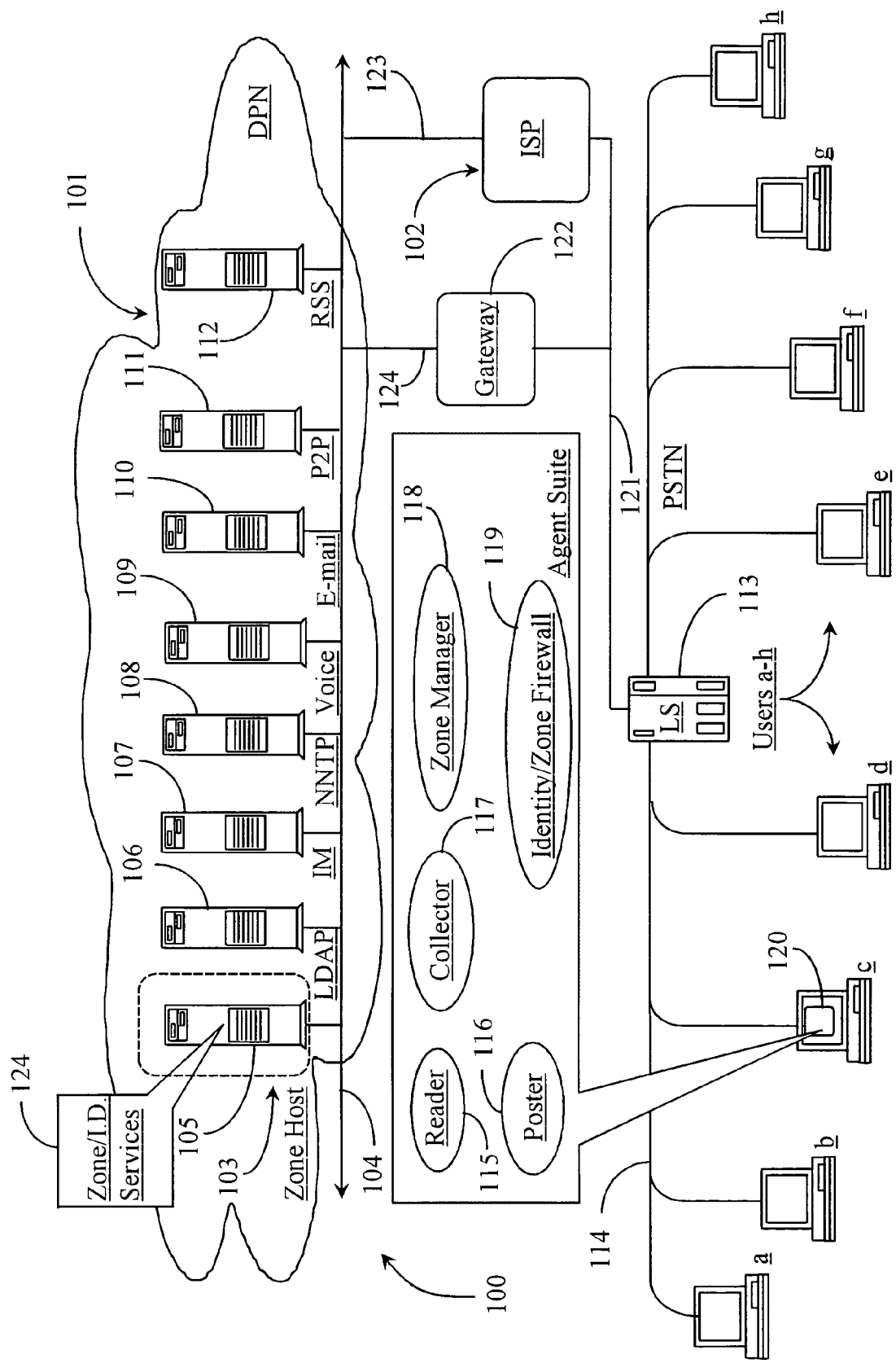
FIG. 1 is an architectural overview of a communications network for practicing identity and zone-managed communication and digital collection according to an embodiment of the present invention.

FIG. 1 is an architectural overview of a communications network 100 for practicing identity and zone-managed communication and digital collection according to an embodiment of the present invention. Communications network 100 encompasses a data-packet-network (DPN) 101 and accessing users a-h.

DPN 101 is the well-known Internet network in a preferred example, which includes any sub-networks that might be connected thereto such as an Ethernet network, an Intranet network, or any other compatible data networks. The inventor chooses the Internet as a preferred example because of a characteristic of unlimited public accessibility.

Users a-h are illustrated in this example as an array of desktop computer icons representing computer stations capable of Internet access and interaction. One with skill in the art will appreciate that there are a variety of computer station types known as well as a variety of Internet-access methods known. For exemplary purposes users a-h are shown connected to Internet network 101 through a public-switched-telephony-network (PSTN) represented herein by telephony connectivity network (114,121), which provides access through an illustrated telephony switch 113 to an Internet service provider (ISP) 102. Telephony switch 113 is a local switch (LS) local to particular user group a-h.

In this example, the Internet connection method is simple dial-up services through an ISP as is common in the art. Other Internet access conventions such as cable/modem, digital subscriber line (DSL), integrated services digital network (ISDN), and more recently developed wireless conventions can also be used.

ISP 102 connects to an Internet pipeline or backbone 104, which represents all of the lines, connection points, and equipment that make up the Internet network as a whole. Therefore, taken into account the known ranges of the Internet and PSTN network, there are no geographic limits to the practice of the present invention.

A gateway 122 is illustrated in this example and represents a gateway between Internet 101 and PSTN (114, 121) such as the well-known Bell core standard of SS7, for bi-directional transformation of telephony signaling and data-packet-streams for communication over the respective networks. Gateway 122 may also be a wireless application gateway into network 101 without departing from the spirit and scope of the present invention. Gateway 122 is connected to backbone 104 by an Internet line 124.

Internet 101 represented in breadth by backbone 104 has a plurality of electronic data servers illustrated therein and adapted individually to provide some form of communication services or other network services. A Lightweight Directory Access Protocol (LDAP) server is illustrated as connected to backbone 104 and adapted to provide access to users analogous to users a-h to directory services. LDAP is a software protocol that enables any user to locate any other user, organization, resources file, or network connected device. In this example, LDAP server 106 may play a roll in providing access to loose social groups whose members use identity-oriented routing of messaging and zone management for communication and collaboration with each other and fringe associates that may not have client software used by group members as will be described in more detail later in this specification.

An instant message server 107 is illustrated within Internet 101 and connected to backbone 104 for communication. IM messaging is an asynchronous form of communication comprising routed messages. A goal of the present invention is to enable routing of IM messages according to identities and zones. IM server 107 represents any of the widely available and known instant message services like AOL™, Microsoft™, ICQ™, and others including those that leverage presence protocols.

A network news transport protocol (NNTP) server 108 is illustrated within Internet 101 and connected to backbone 104 for access. NNTP is the predominant protocol used by software clients like Agent and servers for managing notes and files posted to Usenet groups. NNTP protocol replaced the original Usenet protocol Unix-to-Unix-Copy Protocol (UUCP). NNTP servers manage the global network of collected Usenet newsgroups and include servers that provide Internet access. An NNTP client is included as part of a Web browser or, in the case of this example, a separate client program called a newsreader described further below. An NNTP sever is accessed for the purpose of browsing messages, posting messages, and for downloading messages and files. As described further above with reference to the background section of this specification, NNTP servers also can be dedicated to storing binaries (music, movies, pictures, games, etc.), available for downloading and allowing Usenet patrons to post binaries to the server.

A goal of the present invention is to provide routing of Usenet messages and binaries according to identities and zones as described further above. As described further above with reference to the background section of this specification, the inventor is aware of and has developed the newsreader application known as Agent. The present invention relates to novel enhancements to the prior-art version of the application, the enhancements enabling identity oriented routing and message management according to created zones.

A voice server 109 is illustrated within Internet 101 and connected to backbone 104 for access. Voice server 109 is analogous to a Voice over Internet Protocol (VoIP) server capable of storing and forwarding voice messages or of conducting real-time voice session between two or more parties connected to the network including connection from a remote analog network via telephony gateway. Although methods of the present invention deal largely with asynchronous communication, one goal of the present invention is to enable network-hosted interaction services that use identities of sender and receiver in the concept of created identities that are zone specific to route live voice interactions sourced from either network 101 or PSTN 114,121. Voice server 109 may also be assumed to represent an analog counterpart held within the PSTN network in terms of functionality.

An email server 110 is illustrated within Internet 101 and connected to backbone 104 for access. Server 110 represents a typical email server having a port for post office protocol (POP), a port for simple message transport protocol (SMTP), and a port for Internet mail access protocol (IMAP), which is a Web-based service that allows users access to email from any browser interface. A goal of the present invention is to enable routing of emails according to created identities and zones managed by a unique firewall application described further below.

A peer-to-peer server (P2P) 111 is illustrated within network 101 and connected to backbone 104 for access. P2P server 111 is analogous to any source or relay server of digital music, movie, or picture files that can be downloaded there from by users. Server 111 can be a proxy server that accesses individual desktop computers to retrieve content from a "shared folder" adapted for the purpose, as is the general practice of well-known music download services.

A really simple syndicate (RSS) server 112 is illustrated within Internet 101 and connected to backbone 104 for network access. RSS is a format for syndicating news and the content of news-like sites, including major news sites like Wired™, news-oriented community sites like Slashdot™, and personal Weblogs. An RSS server can handle other formats besides news formats. Any topic that can be broken down into discrete items can be syndicated using RSS, for example, the history of a book. When a subject matter is presented in RSS format it is delivered as an RSS feed to an RSS-enhanced reader, which can periodically check or monitor the feed for any changes and react to the changes in an appropriate way. An RSS enhanced reader can be thought of as a news aggregator that alerts the user to any new items in the RSS feeds. It is a goal of the present invention to enable identity oriented routing of RSS feeds using created identities and managed zones.

It will be apparent to one with skill in the art that the plurality of servers illustrated in this example represent differing types and forms of communication and interaction including "digital collection" interaction. One goal of the present invention is to enable fast sampling of digital postings of binaries and downloaded collections thereof in a more efficient and identity oriented manner, including routing downloads of such materials into appropriate user zones based on identity and content-related information.

Users a-h may be assumed to be operating an Agent software suite 120 shown in display on user computer c in this example. It may be assumed that all users a-h have SW 120 resident on their workstations or at least a portion of suite 120 operational and locally executable. SW 120 is expanded in illustration from display on station c to reveal several application components. These are a reader application 115, a posting application 116, a collector application 117, a zone manager application 118, and an identity/zone firewall application 119.

As a software suite (120), applications 115-119 may be provided having various levels of integration and standalone functionality without departing from the spirit and scope of the present invention. The inventor illustrates the functional portions or applications of suite 120 separately for the purposes of describing separate functions and capabilities and in actual practice some of applications 115-119 may be provided as standalone applications that can be installed separately from each other the whole of which when installed work together as a functional and integrated application suite.

Reader application 115 encompasses functionality for accessing and browsing news servers like NNTP server 108 for sampling and subscribing to news groups and message boards. In this example, reader 115 is enhanced (RSS plug-in) for navigation to an RSS server like RSS server 112 for the purpose of sampling and subscribing to news feeds and other informational feeds. Reader 115 may be assumed to contain all of the former functionality of the Agent newsreader described with reference to the background section and which is available to the inventor. Reader 115, for example, allows a user to read and download messages and to monitor message threads of certain users that have posted to a server. Reader 115 can also monitor news feeds and alert a user when new feed content is available.

Reader 115 may be assumed to include a graphical user interface (GUI not illustrated) that includes capabilities of navigation to different online news servers and other typical browser functions. Reader 115, in preferred embodiment, has interactive GUI linking capability to and is, in various capacities, integrated with posting application 116, collector application 117, zone manager 118, and firewall application 119. In one embodiment, a single main GUI is provided that interlinks access to the functions provided by all of applications 115-119. In this embodiment a partial suite 120 not including all of applications 115-119 would have GUI icons that represent the missing components, however such icons might be "grayed out" or otherwise caused to indicate that one or more applications of suite 120 is not installed. In a preferred embodiment application 119 is provided as a default component of suite 120 because it provides the basis for identity-oriented routing of messages and interactions.

In another embodiment, separate GUIs are provided as standalone GUIs for each functional application wherein appropriate GUI links are provided for navigation from one interface (functional application control) to another. There are many possible design possibilities.

Posting application 116 encompasses the capability to post (upload) messages and binaries to NNTP servers and posting boards. Poster 116 has an interface, not illustrated, for creation and upload of created postings, which include text-based postings and binary postings. Poster 116 is RSS-enhanced as was described with reference to reader application 115. In this way a posting user can create news and informational feeds upload them to RSS server 112, for example, for other users to download.

Collector application 117 enables digital sampling and collection of binaries from NNTP sever 108 and in some configured cases from P2P (server 111). Collector application 117 enables identity-oriented tracking and sampling of posted materials. Collector 117 is provided as a dedicated application, in a preferred embodiment, however it may also be integrated with reader 115 and poster 116 without departing from the spirit and scope of the present invention. In one embodiment collector 117 may be integrated with other applications as well such as a music jukebox application, media server applications, content management applications, and streaming content applications.

Zone manager 118 is a utility for enabling a user to create special identity-oriented (IO) workspace zones (not illustrated) that may have one or more associated identities. By default, a certain generic set of IO zones might be provided with suite 120, however a user may create as many IO zones as is required to comfortably manage messaging according to identity. The policies of IO zones are enforced by firewall application 119. The concepts of IO zones will be detailed later in this specification.

Firewall application 119 is a utility for enforcing IO-routing of messaging and interaction according to policy related to active zones. Firewall 119 provides a single security and message routing solution that can be used to handle incoming and outgoing email, IM interactions, and interaction associated with other media channels including voice channels using multiple identities and of various accounts.

In practice of the present invention, suite 120 enhances prior-art functionality associated with standalone newsreaders, messaging clients, and digital collecting utilities by first providing a single or series of linked interfaces through which all of the activities can be accomplished and secondly by providing new and novel capabilities of managing interactions and work-related tasks according to one or a combination of user and sender identities, including contact identities. IO zones are firewall-protected (firewall 119) containers of content and workspace having a specified and implicit relationship to the overall activity and workflow generated by suite 120. Several advantages of identity-oriented zone-management capabilities will be described according to various exemplary embodiments detailed later in this specification.

Figure 2:
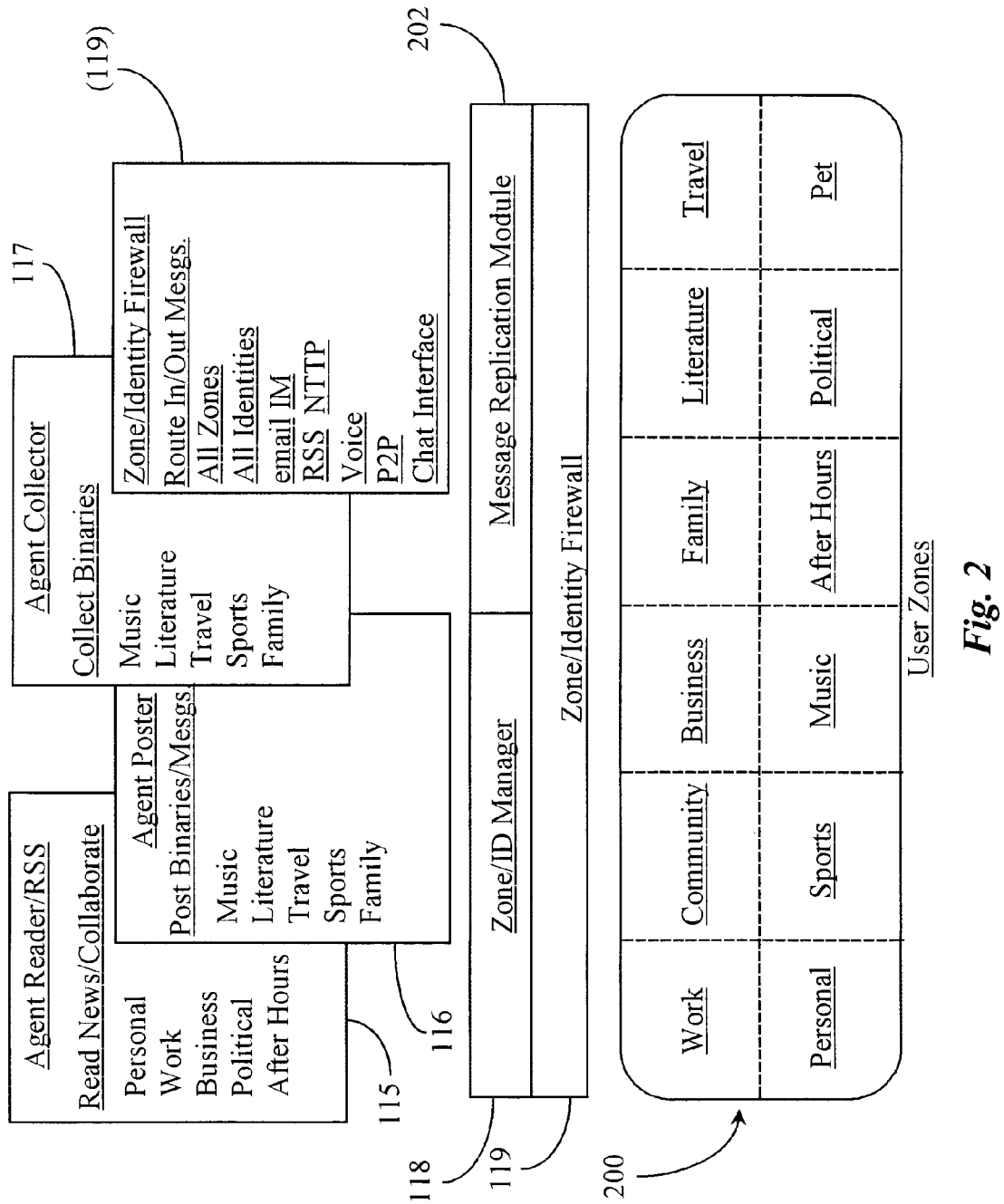
FIG. 2 is a block diagram illustrating software applications and system components of an Agent software suite according to an embodiment of the present invention.

FIG. 2 is a block diagram illustrating software applications and system components of an Agent software suite according to an embodiment of the present invention. Agent software applications include Agent Reader application 115, Agent Poster application 116, and Agent Collector application 117 as described with reference to FIG. 1 above. Firewall 119 is illustrated as a block 119 to preserve hierarchy in description and also in expanded form (119) to show supported routing function and supported communications channels. Firewall 119 is in a preferred example, a resident and self-configurable part of Agent suite 120 and is minimally adapted to direct final destination routing of incoming messages and to provide zone and identity policy violation alerts to users when user or external contact behavior might trigger such alerts.

Agent Reader application 115 includes a plug-in for disseminating RSS feeds as previously described. Reader 115 is adapted to enable a user to subscribe to NNTP news groups and to collaborate using messaging and posting in conjunction with Agent Poster 116. In a preferred embodiment of the present invention, a user has identity oriented zones (200), which are segregated from one another and may include separate identities associated thereto each separate identity belonging to the same user and administrator of the zones.

In this example, reader 115 lists the exemplary user zones 200 reading from top to bottom within block 115 as a personal zone, a work zone, a business zone, a political zone, and an after hours zone. Each zone is adapted for material segregation and messaging according to the differing identities of the user enforced by firewall application 119. For example, the personal zone would be used in routing all of the user's correspondence messages and subscribed-to materials that are of a personal nature or considered personal such as messages to and from personal friends, family members, and trusted individuals. A personal zone has at least one user identity (contact parameter) that the user is willing to share with personal friends, family, and other trusted individuals.

A work zone is adapted for correspondence and collaboration between the user and those associates related to the user's employment. The user identity associated with his or her work zone may be shared only with those individuals associated with the employment environment of the user. All correspondence associated with the work environment of the user is routed to and from the work zone.

A business zone is exemplary of a zone adapted with a user's business identity. Perhaps a user has a separate business he or she is conducting separately from work. All correspondence then that relates to the user's business is routed to and from this zone. The identity (contact information identifying the user) associated with the business zone is the identity that the user leverages in correspondence to all those related to the business.

A political zone contains the user's political identity and segregates the user's political correspondence and activities from other zones. Political fund-raising activities, campaign work, political correspondence, letter writing, and so on is contained within the political zone.

An after hours zone contains the user's after hours identity that he or she is willing to share with related organizations, Web-sites, and so on. The user may be single and belong to one or more dating services. The after hours identity then would be used to correspond with other singles of the same service for example. The user's after hours identity is separate from all other zone-specific identities and no one has this identity of the user except those authorized to correspond with the user along any subject falling within the after hours zone policy.

It will be apparent to one with skill in the art that the zones listed and associated with Agent Reader 115 are exemplary and may be of different titles and number than are illustrated in this embodiment without departing from the spirit and scope of the present invention. It is also noted herein that different activities enabled by different portions of the Agent suite may be associated with different zones as evidenced by the listing of only some of zones 200 within block 115. Different portions of the Agent suite may also utilize the same zones without departing from the spirit and scope of the present invention.

In one embodiment of the present invention, certain generic zones common to most users like personal zone and work zone for example are pre-configured and provided for a user. A user may configure new zones and identities as needed or desired. When an existing zone encompasses subject matter that begins to vary within the context of the zone, a user may split the zone into two new zones having separate identities if desired. There are many possibilities.

Agent poster 116 is used to post information (messages and binaries) to Usenet groups, posting boards, and other supported venues. Reader 115 and Poster 116 are in a preferred embodiment integrated and accessible through a common interface. However, poster 116 may also be provided with its own interface as a standalone application packaged separately without departing from the spirit and scope of the present invention.

The active or configured zones 200 listed within Agent Poster 116 include, but are not limited to a music zone, a literature zone, a travel zone, a sports zone, and a family zone. It is noted again here that the actual zones used may be entirely different than the one listed in this example. The inventor provides certain zone description in this example for discussion purposes only.

A music zone is associated with a user's music identity and may govern all of the user's posting activities with music services, and music binary servers such as may be subscribed to by the user through Usenet or a similar platform. For example, a user's binary collection of MP3 files might be accessible for posting through the music zone interface.

A literature zone is associated with a user's literature interests and might govern a collection of pieces of literature that a user will post to a certain newsgroup for download by others. The zones travel, sports, and family govern materials appropriately associated therewith. For example, the travel zone would contain information about the user's travels, vacation information, and so on. Using poster 116, the user may post information to others related to travel opportunities or experience the user has had. Perhaps a user might post some e-tickets to a certain destination for others to view and perhaps purchase or download. A user might post e-tickets to a basketball game through the sports zone. The same user might post homemade movie files and picture albums through his or her family zone. All correspondence with the user related to such activity is conducted to and from the identity appropriate zone.

It is noted herein that along with segregated user identities attributed to each user zone, zones also have separate contact identity lists identifying those entities that have firewall access to the user through a particular zone and which are allowed to have and know the zone specific identity. All of the activity conducted in zone specificity is managed by firewall 119.

Agent collector 117 is used to find and download binaries posted on Usenet binary servers using NNTP protocols, or other supported Web-storage servers like FTP servers. In the case of FTP (file transfer protocol) sites, both the poster and collector application would be adapted to work with FTP protocols. It is noted that the same zones listed in Agent Poster 116 are also listed in Agent Collector 117. These represent zones that support binary collections in terms of collecting, posting, and viewing.

It is noted herein that poster 116 and collector 117 may be integrated using one common interface without departing from the spirit and scope of the present invention. It is also noted herein that collection of binaries can be practiced in conjunction with use of reader 115 without departing from the spirit and scope of the present invention. Furthermore, the zones listed in reader 115 may also govern posting and collection activities conducted under the identities associated with the appropriate zones. For example, if a user subscribes to a newsgroup server that aids his or her employment and that server allows posting and download of binaries, then the work zone would also be visible or at least accessible from poster 116 and collector 117. Agent Collector 117, like Agent Poster 116 might also be provided as a separate and standalone plug-in to the overall Agent suite.

Identity/Zone firewall 119 provides zone and identity policy enforcement through implicit adherence to the most current zone configuration and identity states. Application 119 may be thought of as a final destination router for incoming messages, interactions and downloads. Similarly, application 119 controls outgoing correspondence insuring that zone and identity policies are not inadvertently violated.

Firewall 119 enforces routing of all incoming and outgoing messages according to zone policy. Firewall 119 may be configured for any or all zones and for any or all identities. For example if a user attempted to email a contact listed in a specific zone while working in a zone where the contact is not supported then firewall 119 would generate an alert describing a zone policy violation and display it for the user before sending of the message would be allowed.

Application 119 directs final destination routing or sorting of all incoming messages and materials according to current zone policy. This may include structured Web-browsing in a zone specific manner. In a simple example of messaging, email directed to specific user identities would be filtered according to appropriate zone inboxes. Other interaction types including RSS, IM, NTTP, Voice, P2P, and Chat may be supported for final destination routing according to zone policy in different ways appropriate to the communication channels supported.

In one example an instant message addressed to a zone-specific user identity causes firewall application 119 to dress the IM interface with an icon or skin that identifies the appropriate zone that the message relates to. If the user is currently messaging with another contact related to another zone then a new IM window reflecting the zone of the new message may pop-up. Similarly, if a user attempts to IM a contact supported by a specific zone using a generic IM interface, then firewall 119 might change the interface to reflect the appropriate zone that supports the contact. If more than one zone supports the contact then firewall 119 might display a message to the user stating that the contact is common to, for example, your work zone and your sports zone. The user may then select the appropriate zone for the communication.

Zone/ID manager 118 described with reference to FIG. 1 above enables configuration of the physical zones and provides update and identity creation services. Zone/ID manager 118 has a user interface or configuration form (not illustrated) that supports zone and identity creation. The exact configuration of a set of zones and associated identities provides implicit rules for firewall application 119 to use in enforcement of zone policy. Additionally, zone manager 118 allows for creation of explicit rules that firewall application 119 can use. An explicit rule can be a permanent rule or a temporary rule and can include a zone, an identity, and a communication channel alone or in combination.

A message replication module 202 is provided and adapted for the purpose of replicating incoming messages to multiple pre-assigned zone inboxes if applicable. In one example using message replication, a user might replicate an incoming email message specific to a user zone to other zones of the user account or other user accounts held on one computer or computer network for example. In this case the user might be an administrator of more than one identity oriented managed account. Zone manager 118 and message replication module 202 as well as IO firewall 119 may be, in one embodiment, provided as proxy Web-based services that enable interaction routing and Web-based workflow management for users accessing and, in some cases interacting in real time with the system through a Web-based portal. In another embodiment, a user may configure and manage zones and identities locally with minimal or no Web-based service support. A Web-based example of identity-oriented-management (IOM) services is described in detail further below.

Firewall 119 as described above is provided and adapted to provide security services for each zone and associated identities and contacts according to zone policy so that no zone cross routing or cross-communication is allowed if it is not desired. Firewall 119 uses zone, identity and contact configuration as implicit policy for managing communication related to each separate zone. In this way an incoming message that should be routed to a user's work zone for example is not routed to any other zone inbox.

Communication activity is governed chiefly by identity/contact pair (sender and receiver identities) enforced by firewall 119. A specific contact listed for a zone-enabled user might exist and may have the same parameters listed for more than one user zone if the contact has only one identity (email address for example). However the destination address (user's zone-specific identity) the contact chooses for email correspondence is preferably specific to only one user zone. For example if a co-worker john@iwork.com sends an e-mail to a zone-specific identity frank@iwork.com and john@iwork.com is associated only with a work zone, then that message would be routed to the associated work zone inbox. Identities are generated for zone management purposes.

However, it is possible that John only has one contact identity and in addition to being a co-worker also is a trusted family friend that has knowledge of a user identity specific to the family zone, perhaps frank@family.net. If John uses family.net as the destination address in the To: line of the email message then the email message is automatically routed to the family inbox instead of the work inbox according to identity.

In the above-described routing example, John could inadvertently send a work-related mail to the family inbox if the types or inserts the family identity into the destination address by mistake instead of the work identity if he is privy to both identities. However, the fact that the identity visibly suggests to John that this is a family-related identity might alert him of the mistake before send. In actual practice, John will most likely have a work and a home email address even if he does not use the system of the invention. The contact information for John can be strictly managed so that the work zone does not support John's home email address and the family zone does not support John's work email address. More simply stated, if John mistakenly sends a message to the family identity from work firewall 119 will catch the mistake and alert the user of an incompatible identity-contact pair.

In one embodiment an appropriate media handler adapted for a specific message of type can parse subject lines and content of an email message, for example, for an indication of zone specificity. It might be that John has no only one identity that is shared as a same contact parameter across more than one user zone. In this case if John's subject line reads, "project management report" for example, but the destination address of the message is the family zone identity, firewall 119 will designate the work zone as the appropriate destination instead of the family zone according to subject line interpretation. In this case it is assumed that a list of keywords and phrases would be provided that are zone specific for parsing to work successfully. If the subject line is blank or otherwise not recognized, firewall 119 may intervene with a user alert to manually select which of the zones listing john@iwork.com the message from John should be routed to.

It is noted herein that if John of the above example is operating from an interface of the present invention to collaborate with Frank, then John will likely have separate identities for his own work zone and family zone, the identities listed as contacts in Frank's respective work and family zones. In this case, zone-to-zone collaboration is performed seamlessly with no errors due to synchronization of identity/contact parameters. More detail and specific examples of message routing according to identity/contact pair will be provided later in this specification.

All zones of a user may be configured on the user's desktop and some or all of them can be replicated at a network portal if the user has subscribed to network hosted services. Such services may be offered through zone host 103 described with reference to FIG. 1 above.

Exemplary zone list 200 is illustrated in this example and includes the zone descriptions work, community, business, family, literature, travel, personal, sports, music, after hours, political, and pet. Zones 200 are exemplary only as any one user may have fewer or more zones. List 200 simply exemplifies the possibilities of different zone types that might be created. It is also noted that not all of the existing zones in this example are necessarily configured for posting and collecting activities. However, it may be assumed that all created zones support at least messaging and news group association. In this particular case, the user may have 12 different identities, one for each illustrated zone.

Figure 3:
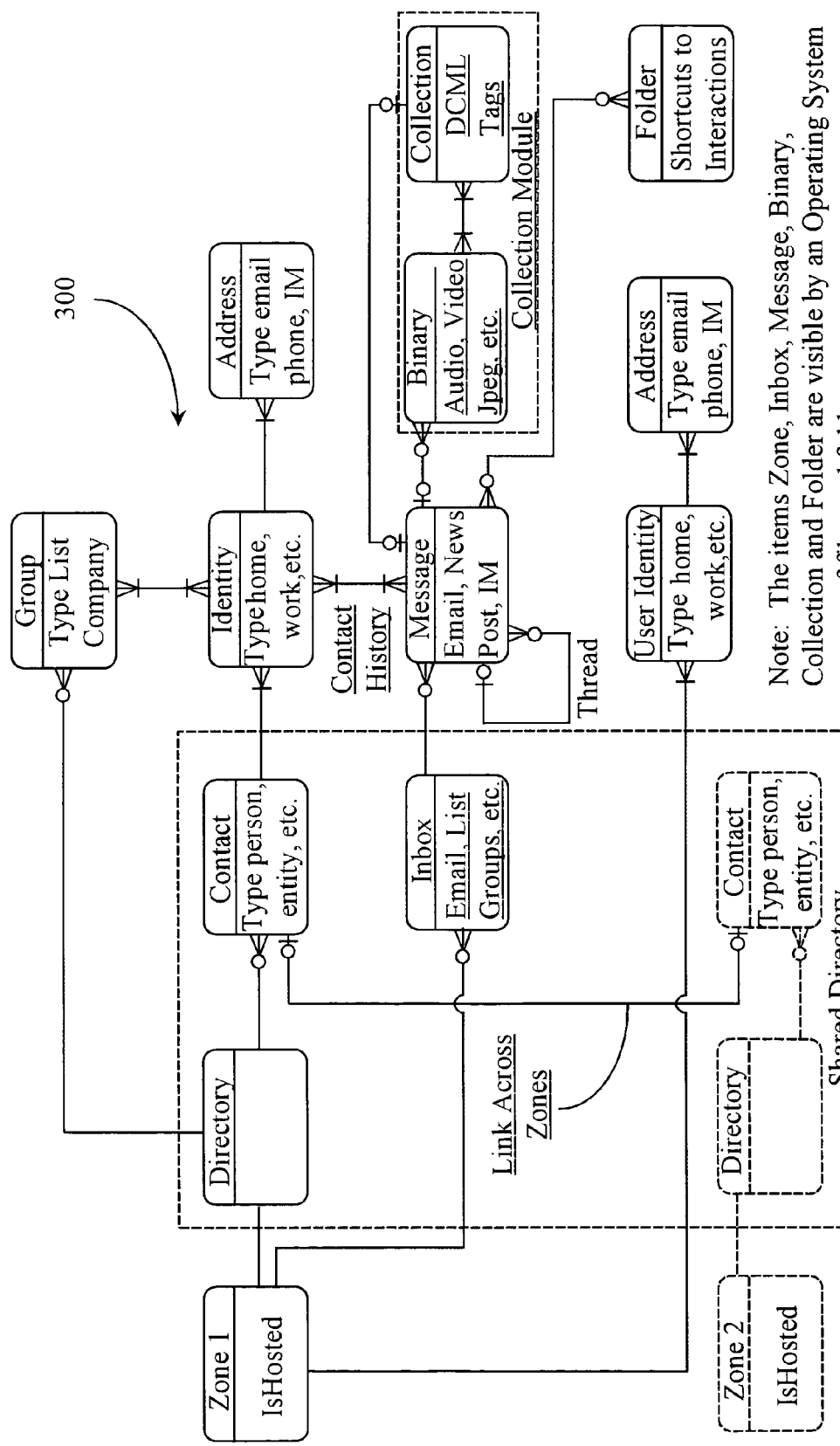
FIG. 3 is an entity relationship diagram illustrating structure of a zone according to an embodiment of the present invention.

FIG. 3 is an entity relationship diagram 300 illustrating structure and function of a zone according to one embodiment of the present invention. Zone structure 300 illustrates the existence of certain zone objects and their relationships in a zone object hierarchy. A first zone or Zone 1 is illustrated herein with an indication that the zone is hosted (IsHosted). This means that the zone in question including all associated objects thereof is managed by proxy by a network-based service that keeps track of message routing and replicates activity to desktop systems when user's log in to access the system. In one embodiment, zone 1 might not be network hosted.

Zone 1 has a Directory, which is adapted to list one or more Contact(s) that are approved for that particular zone. Contact can be of Type person or entity. Directory may also list one or more Group(s), which may be of Type List or Company. List or Company implies a generic contact parameter that is associated with more than one possible final destination. For example, a Group might be labeled Machine World and might be of Identity Business, which has an Address of Type email=sales@machine.com and a message sent there might be routed to one of a number of possible sales agents.

Contact has an Identity that can be of type home, work, etc. A contact Jim might include Jim's work identity="Jim at work" or his home identity="Jim at home". Jim might also have an Identity=Jim mobile (not at work or home). Identity has an Address, which can be of Type email, telephone number, IM address, etc. For one zone it is typical that a contact specific to that zone would have one identity and only one of each supported address per supported communication channel. For example if zone 1 is a family zone then Contact=person, Identity=home, and Address=email and telephone number would be a logical configuration. The email address and telephone number identifies the channels and destination parameters used to reach Contact at Home.

Zone 1 has a User Identity, which may be of Type home, work, etc. Like a contact, User Identity has an Address of Type email, telephone, IM, etc. User Identity might=Frank at Home and have an Address of Type email=frank@myhouse.com and a home telephone number, and an IM address=frank@hotmail.com. User Identity identifies the zone owner or administrator.

A user identity is specific to a zone and identifies the owner of the zone in a manner specific to the zone adaptation. For example an identity can be a home identity, a work identity, an after hours identity and so on. If the identity is a work identity then the zone it is associated to will be a work zone. A user identity has an address where mail is routed (email) and may also include a telephone number, an IM address, and other communications address information if desired. For example a user identity for a work zone will include a work telephone number whereas a user identity for a home zone will include the home telephone number. That is to say if telephone contact information is included.

A directory may, in one embodiment, physically include the zone identity (user identity for zone) along with listed contacts but may be segregated and not explicitly identified as a contact but as the identity of the user for that zone. In this example, User Identity is not illustrated as included within Directory but is a separate attribute of Zone 1. A user identity might also be expressed as a "Group" identity although the possibility is not illustrated in this diagram. A group identity might include a number of separate users all having administrative access at one time or another to the same zone wherein the sum of users are expressed as a single group identity=Maple Church, for example, wherein a list of church zone-authorized members might be aggregated together under an Address or Type email=congregation@maplechurch.com. There are many configurable possibilities. The case of group user identity implies administrative equivalence among the listed individuals sharing the zone.

Zone 1 has at least one Inbox, which may include an email box, a voice mail box, a box holding subscribed-to mailings from a list server, a box for newsletters or notices from subscribed-to news groups, RSS Feed, etc. Inboxes are flexible according to supported channel. For example, an inbox might be provided to take incoming communication or materials coming in over any supported communication channel.

In one embodiment there will be a single inbox set up for each supported communication form. For example an email inbox specific to the email address of the user identity is provided to contain incoming emails sent to the particular email address specifying the user identity of the zone. For example, all mail incoming to John@iwork.com goes into the email inbox of that zone. An inbox may include an interaction logging function, for example, to record message or call details of incoming and outgoing activity for accounting purposes and the like.

In one embodiment only a single inbox is provided within a zone and adapted to accept all supported communications addressed to the user identity for that zone. For example, if a user has a private telephone number that is specific to the zone and published to approved contacts, then all calls to that telephone number wherein the sender identity of the caller matches one in the zones contact directory will be routed to the zone message inbox as voice messages.

Inbox may contain one or more Message(s), which can be email messages, newsletters, Internet postings, Instant messages, etc. Likewise any message can be part of a message thread such as an ongoing email correspondence. In one embodiment Identity, an attribute of Contact may have a Contact History of kept messages that can be reviewed as a thread. In this case messages that are part of correspondence with a certain contact can be sorted serially or by other methods and isolated as correspondence records attributed to that contact. Message(s) can be sorted to one or more Folder(s) setup within an inbox for sorting messages appropriately according to folder type such as "message threads", "newsletters", "chat transcripts" and so one. In this case a user may click on an appropriate folder to view any new messages that have been filed since the last inbox access. Folders may also include a Spam folder, or a folder for unsorted messages.

Message(s) is linked to Collection, which is an activity attribute of a Collection Module that includes a Binary attribute. Binary files, which may be audio files, video files, picture (Jpeg) files and so on may be sampled and collected (downloaded) through inbox architecture. Collection includes sampling available files that are marked or tagged with a digital collection markup language (DCML), which is a convention provided by the inventor to enable more structure in sampling and tracking digital content that may be posted for example, in a binary server.

When posting material with an application adapted for the purpose, a poster may use DCML tags to summarize and identify posted materials. A user looking for posted materials has use of a DCML reader that can find and interpret DCML tags. In this way a user can more effectively and efficiently obtain materials from servers and from P2P networks. In this case a binary server for zone 1 might be a listed contact (entity) and might have an identity of "collection". It is noted herein that Folder is also an attribute that is applicable to Binary and Collection where digital content may be sorted and kept in specified folders accessible through inbox architecture.

Zone 1 is associated in this example to a second Zone 2 at the level of directory. In one embodiment a directory might be shared between two separate zones as illustrated by a dotted rectangle labeled Shared Directory. The attribute Contact of Zone 1 is linked to Contact of Zone 2. This indicates that certain contacts of Zone 1 are also approved and available from the directory of Zone 2 while working from Zone 2. In this sense, both directories share one or more common contacts. The level of contact linking across two or more zones is a matter of design and sharing can be configured such that the shared contacts may be the same only in abstract identity but may exhibit differing attributes with respect to actual contact parameters.

As described further above, the concept of hosted zones as illustrated in ER diagram 300 relates to a unique service for routing and managing zone specific interaction wherein zone owners have unique identities that the outside world sees and wherein contacts approved to interact within a user zone are the only entities capable of interaction with the user in a particular zone. In a hosted embodiment, the user subscribes to a portal service that provides routing services that are identity and zone specific as described further above. In this regard a portal page is provided for the user to check and view zone activity from any network-capable device. In a hosted embodiment a user may synchronize with the Web-service updating zone structure and content between a local computer and the server hosting the zones. The zone-hosting service is especially useful for a person or a group of persons having many zones and identities to manage. A person having only two zones for example may not require host services. If more thin one user or a user group shares a zone then zone hosting may be more likely.

Identity oriented management then may encompass all interactions between a zone owner (zone ID) and outside entities in a secure manner such that no disapproved contacts become privy to zone identities and similarly wherein no created user identities are provided inadvertently to disapproved contacts. In one embodiment a user may elect that no zones are hosted and may manage all of his or her zone-specific communication and archiving on his or her own computer. In either case of hosted or non-hosted zones, the structure is essentially the same and zone policy is enforced in both cases by a zone firewall (119, FIGS. 1 and 2) that will be described in yet more detail later in this specification.

It will be apparent to one with skill in the art that ER diagram 300 may include more or fewer attributes and may be extended to provide additional component types and different associations between components without departing from the spirit and scope of the present invention.

In one embodiment of the present invention, a user may have an IP telephony application configured to be accessible from the well-known PSTN network through normal telephone dialing for example. In this case a telephone number may be mapped to an IP application and specified to a particular zone so that live voice sessions may be conducted in a zone-specific manner. Any incoming calls that do not include information of the caller that matches a contact in the zone directory would be automatically rejected or sent directly to voice mail as a zone policy violation by firewall 119. Instant messaging and other application-based sessions like P2P file sharing can be conducted as well in a zone-specific manner. Outbound campaigns specific to media types such as voice or email may also be conducted in an identity oriented manner.

In one embodiment, the message attribute of Inbox can identify an interaction thread (chain of correspondence) with one or more contacts having access to the zone identity for communication. Such interactions can include, but are not limited to voice messages or transcripts, email correspondence chains, chat transcripts, message board or Usenet postings and reply threads specific to contact/user identity pairs, and so on. These correspondence histories or threads may be stored as separate interactions in one or more folders adapted to contain them.

Folders can be identified in any number of ways. For example, in a pet zone there may be a folder labeled after a news group topic alt.showdogs wherein the messaging history is recorded as an ongoing interaction between the user identity and one or more approved contacts participating in the group. In this sense, all of the related communiqués posted by the specified contacts (newsgroup members) listed in the zone directory would be automatically downloaded and stored in the folder as an ongoing interaction. Further, the system can alert users by any one of various communication protocols of any new updates to interaction threads maintained in any of various sub-folders that might be created.

As previously described, folders may be provided to segregate materials that are received in a zone inbox or inboxes. Folders are shortcuts to data and can be navigated in typical OS fashion wherein opening of a folder reveals the files contained therein. Each inbox may have one or more folders associated with it. A Zone and its navigable components including Inbox, Message, Binary, Collection, and Folder typically reference folders that are visible to an operating system of a host computing device as a navigable tree of files and folders.

It is noted herein that interaction may also involve downloading, posting, or even sharing binaries (via P2P, NNTP, email or IM) that belong to a user's binary collection. For example, if the zone is a music zone and there are contacts in the contact directory that are authorized for content sharing, then binaries that are posted by those contacts can be detected and downloaded to the appropriate zone specific inbox.

In one embodiment a zone can support P2P contacts that can be listed in a zone directory and can be given access to a zone interaction folder for the purpose of uploading content there from or depositing content thereto using an application similar to a file sharing application or an FTP application. In traditional P2P networks there is a proxy server that accesses a user's computer on behalf of another requesting user that is looking for a specific file to download such as a music file. In this case, the service might be network hosted by the zone host described with reference to FIG. 1 above and members may be prevented from accessing a file unless they are added to a zone directory list of authorized content sharers.

Figure 4:
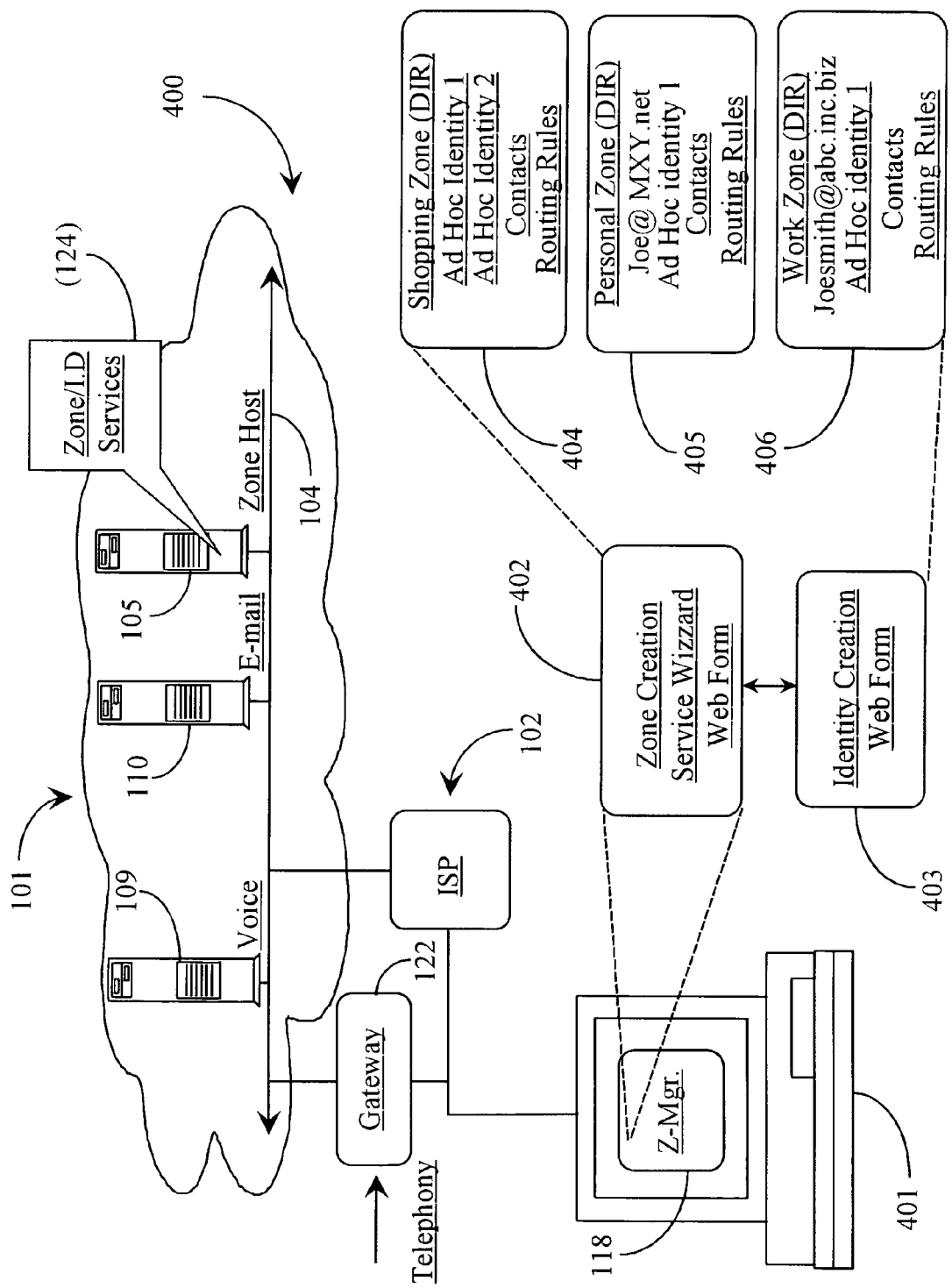
FIG. 4 is an architectural view of a user interacting with Web-based zone creation services according to an embodiment of the present invention.

FIG. 4 is an architectural view 400 of a user interacting with Web-based zone and ID creation services (124) according to one embodiment of the present invention. Zone-host server 105 provides zone-hosting services represented herein by zone/ID services software 124. Zone host 105 is represented logically herein as a single server, however one with skill in the art will recognize that as an entity providing zone management and firewall routing services, there may, in actual practice, be more equipment associated with the function. The inventor represents host 105 as single server herein for simplicity in illustration only. A more detailed example of zone-host architecture according to one embodiment of the invention will be provided later in this specification.

As previously described above, zones uniquely identify a genre and a user. Hosted zones enable server-based activity and local computer-based activity with synchronization of the two. A user 401 has an instance of zone wizard or manager 118 executed and running on a local computer for the purpose of creating zone architecture and zone IDs.

User 401 has computer connection on-line through ISP 102 to backbone 104 and zone-host server 105 offering Zone/ID services 124. In this case, server 105 thereafter hosts the zones created by the user and wizard 118 is served in this example as a series of Web-forms 402, for creating zone architecture, and 403 for creating identities specific to created zones.

In this example there is a zone 404, a zone 405, and a zone 406 all created with the aid of Web-forms 402 and 403. In a one embodiment zones are first created and then identities are created for each zone. Shopping zone 404 has a directory for including zone-approved contacts. Contacts may be added singularly or selected and imported from other applications. The contacts added to a zone will be privileged with the user identity and contact parameters attributed to that zone for enabling correspondence between the zone owner and the approved contact. Contacts may also be added to zone contact lists implicitly as a result of workflow activity, if a rule is configured for the purpose.

It is noted herein that shopping zone 404 does not have a permanent identity associated with it. Rather it has one or more, in this case two ad hoc identities, ad hoc identity 1 and ad hoc identity 2. This might be because the particular user does not wish that any sales or service organizations he or she might purchase from over the network has access to any permanent contact information. The user in this case prefers to use a temporary email address for example as the only means of contact with an organization.

To illustrate a simple example, identities for shopping zone 404 could be temporary email addresses used to conduct online transactions with selected organizations that then would be listed as approved contact entities for zone 406. Zone-host server 105 through an identity creation service provides the temporary email addresses. In actual practice the host owns a domain and sub-domain for enabling users to apply for ad-hoc identities that can be used until such time a user no longer requires the address. In one embodiment a generic email address domain can be provided to all subscribers to use when applying for an ad-hoc identity wherein the user creates the identity portion or name portion for each address.

Ad-hoc identities enable users to keep consumer related mail segregated from their other identities used for personal correspondence, work-related correspondence, and other correspondence where wading through sales-related adds, service offers, and so on is not desired. An ad-hoc identity facilitates correspondence with a service organization, for example, until the user no longer desires or requires communication with that particular contact. At that the time the ad-hoc identity can be expired from service leaving the contact with no simple way to reach the user. Similarly, the contact can also be purged from the contact directory if desired, or the next time correspondence is desired with the particular contact a new ad-hoc identity can be created. Another advantage for using ad-hoc identities is that if the contact compromises the identity by providing it to third parties then the user can simply expire the identity.

Personal zone 405 has a user identity of joe@MXY.net used for personal correspondence with friends and other trusted contacts. Zone 405 also has an ad-hoc identity that can be used for example in correspondence with some contact entities like a dating service for example, where the user will correspond with a contact for a period before letting that contact have access to the users permanent identity.

Work zone 406 contains the users work identity joesmith@abc.inc.biz used for work correspondence. An ad-hoc identity is similarly acquired for temporary work relationships where it is not desired that the contact or contacts have permanent access to the user. All of the users work associates would be listed in the contact directory for zone 406.

In typical application for zones where there is at least one permanent identity and at least one ad-hoc identity, the contacts listed in the directory would be associated with one or the other appropriately so that outgoing messages do not provide the wrong contact with the wrong identity. It is also noted herein that zones 404-406 each have at least one inbox. Inboxes for the illustrated zones may include identified folders and sub-folders that are specific to certain messages or message threads involving correspondence with certain contacts as described above with respect to FIG. 3.

In typical practice of network hosted zone management, after a user has created zones, server 105 functions as a store and forward server that can receive correspondence addressed to the hosted zone identities and route the messages to the appropriate inboxes and folders based on identity of user (recipient) and contact (sender) enforced by firewall. Server 105 becomes the user's email server; phone message server; IM server; and voice server. User 401 may connect to server 105 and view stored messages through a portal page user interface (UI) dedicated to and personalized for that user. Several different views can be presented and the user may delete, download, or view messages and can reply to and send messages from the same portal interface.

If the user has a personal email account at email server 110, server 105 can be designated as a forward destination for all email activity addressed to the original account. The forwarded email may be sorted according to zone policy and may be retrieved using computer 401. Likewise, server 105 can be configured as a routing destination for voice calls (VoIP, etc.) coming in through gateway 122 to voice server 109. The user may create telephone numbers to give to contacts and may have calls to his or her own static personal numbers (cell, landline) forwarded to server 105 for voice message routing into appropriate zone inboxes for voice messages. If user 401 maintains an open-line connection to server 105 for a definitive period such as a work period, the user operating a computer-based telephony application may take live calls filtered through appropriate zones.

If a user desires, he or she may turn off zone-host services for a period of time and receive and send messages directly without inserting server 105 into the routing paths. In any case, zone configuration, contacts, and messages may be synchronized between server 105 and station 401. Synchronization between the server and a remote user station is not required however to practice the invention.

Figure 5:
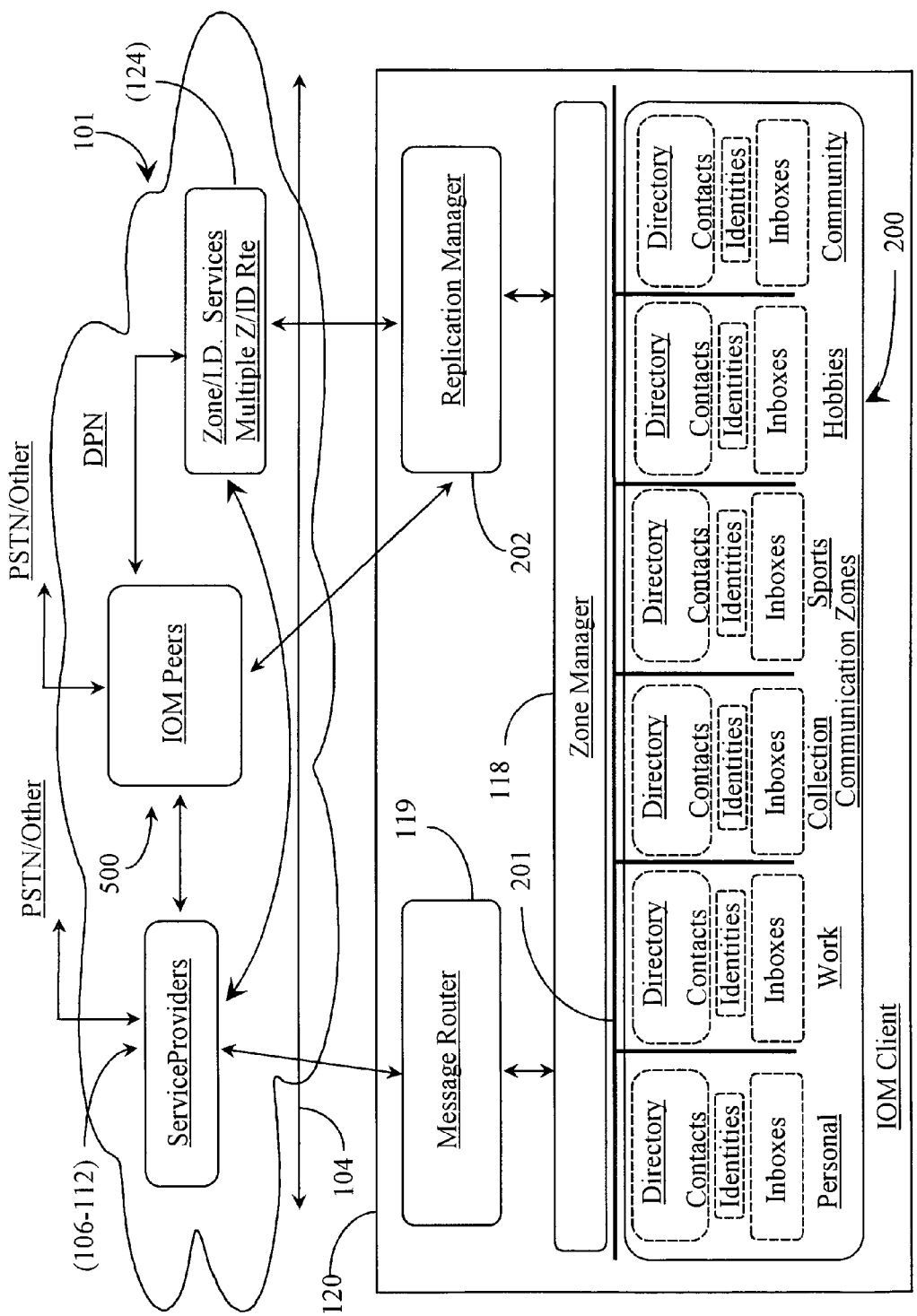
FIG. 5 is a block diagram illustrating interaction paths between an IOM client and network peers and services according to an embodiment of the present invention.

FIG. 5 is a block diagram illustrating possible interaction paths between an IOM client, network peers and service providers according to an embodiment of the present invention. IOM client 120 contains identity-oriented firewall 119, replication manager 202, zone manager 118, and configured communication zones 200. Client 120 might run locally on a user desktop computer, a laptop computer, and in light versions, on other network-capable computing devices having a means of display and input.

The network side of this example (within the domain of network 101) contains service providers 106-112 introduced with respect to FIG. 1 above, a zone host implementation (124) and IOM peers 500, which encompass other users operating all or a portion of an instance of client 120.

In this example, IOM client 120 has numerous zones 200 set up for communication. Zones 200 reading from left to right in zones 200 include a personal zone, a work zone, a collection zone, a sports zone, a hobbies zone, and a community zone. One with skill in the art will recognize that the number and label of zones 200 configured for client 120 may vary widely. In one embodiment, typical zone suggestions like work, personal, family, etc, might be provided and to some extent already set up for a user. A user may build upon the model by adding more zones as required. Although contacts and even identities can be shared between zones if desired, directories for each zone may also be zone specific. Each zone might have one or multiple inboxes including private and shared inboxes.

If zones 200 are hosted zones then the functions of zone manager 118, firewall 119, and replication manager 202 are performed at network level and do not specifically have to be provided locally although they may be. In a zone-hosted embodiment synchronization between on-line and desktop data may be ordered for downloaded/uploaded materials and messages. In this case zone architecture (zones 200) is duplicated at both locations. In this way a user may view or access data on-line using any supported network-capable device including a normal telephone in some IVR-assisted embodiments. In the event of non-hosted zones 200, then the replication, zone management, and firewall functions are all performed within client 120 where they are illustrated in this example.

Any of service providers 106-112 identified with respect to FIG. 1 above might interact directly over the network with client 120 in the case of non-hosted zones 200. Firewall 119 cooperates with replication manager 202 to ensure that messages requiring local replication and local distribution to appropriate zone specific inboxes occurs. For example, if an email from a family member is assigned to an inbox within the personal zone it may also be replicated to another inbox within the same or even different zone if zone policy allows the replication.

It is noted herein that service providers 106-112 and peers 500 may connect from a network other than local Internet 101. For example, one service provider may be a telephony integration provider or carrier through which an interaction or event that will be routed to IOM client 120 is sourced from the PSTN network or another communications network such as a wireless network and carried through network 101. Similarly, peers 500 may be connected to the PSTN (telephone) or another network and interact with client 120 through network 101.

Zones 200 may not all belong to a same user for a given IOM client 120. It is possible to allocate zones to other users. For example a zone administrator may control the personal zone, while a different family member may own the hobbies zone. A replication rule may be set up by the administrator to replicate email assigned to a specific inbox within the hobbies zone to a designated inbox within the personal zone. Such a replication rule would be an explicit rule that may override contact/identity policy thus overriding firewall protection.

IOM peers 500 represent other users that are operating with the software of the present invention and therefore have their own client versions installed, which may be hosted or not hosted. Peers 500 would interact directly with specific service providers 106-112 (depending on communication form) to communicate with the user through firewall 119 in application 120, which actually forms the final zone-specific sorting or routing. In one embodiment where a message is replicated to more than one inbox as part of a collaboration workflow, and the message requires a reply from only one of the involved parties, one user may reply to the message, the action causing notification to the other users that they need not reply to the message.

Alternatively if zones 200 are hosted, then peers 500 and service providers 106-112 would interact directly with services software 124 to propagate text messages, voice messages, and so on. In this case, the server associated with routing an interaction would publish the IP address, telephone number, Enum number, etc. of the client domain maintained by the server. Enum is a known protocol for assigning contact parameters to any networked device or application and renders that device or application accessible from the same or connected networks.

In the case of hosted zones it is noted that when a user connects to the service (124) from a client-enhanced, network-capable device, synchronization may be automated meaning that all messages that have been routed to service-side inboxes and folders are simply synchronized with the user's resident zone architecture if present. In the case of access with a non-client enhanced device, interaction and management can still be performed, as is the case with Web-based email programs for example wherein a user may view mail and download copies without erasing the server-based messages. It is also noted herein that when a user is connected live to services 124 then real time interaction is possible.

Figure 6:
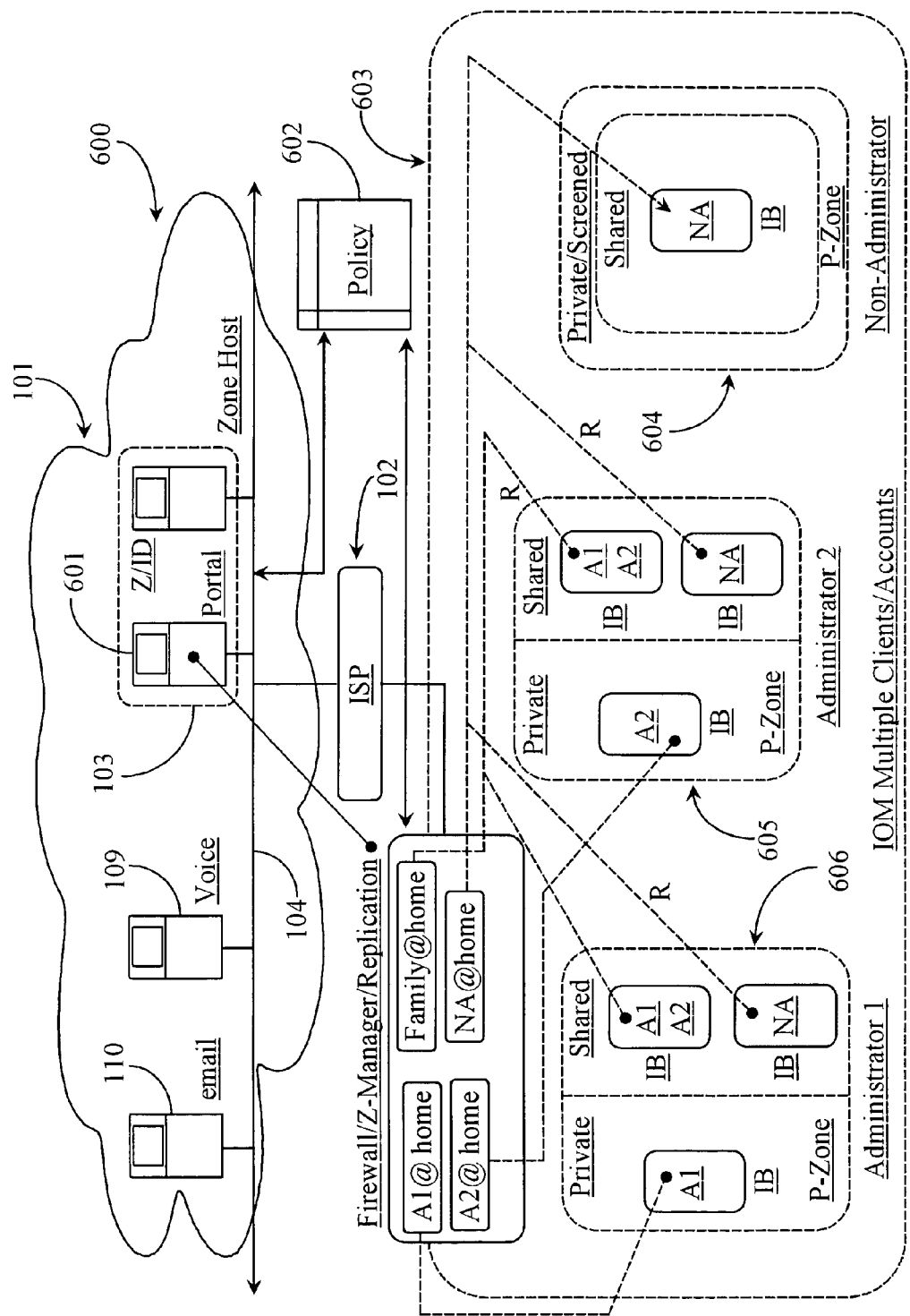
FIG. 6 is an architectural overview illustrating an example of replication of messages according to an embodiment of the present invention.

FIG. 6 is an architectural overview 600 illustrating an example of replication of messages according to an embodiment of the present invention. Overview 600 encompasses Internet 101 and an exemplary IOM client domain 603. Domain 603 may represent one IOM client having multiple accounts or it may represent more than one separate IOM client account resident on one machine. In the case of separate accounts (3 in this case), they may be distributed to more than one networked machine wherein each machine shares a same and active Internet connection such as a DSL connection.

In this example according to one embodiment of a single client having multiple accounts, IOM client 603 is integrated for more than one user. An administrator 1 is illustrated within client 603 and is represented herein by a dotted rectangle 606. An administrator 2 is illustrated within client 603 and is represented herein by a dotted rectangle 605. A non-administrator is illustrated within client domain 603 and is represented herein by a dotted rectangle 604. Assuming for example that IOM client 603 is used by a family, then administrator 1 (606) might logically be a father, administrator 2 (605) might logically be a mother, and non-administrator (604) might logically be a son or daughter, the aggregate comprising a family sharing one IOM client.

In this case, replication of messages is governed by zone policy, with replication ordered across the included user accounts. This case can exist regardless of whether zones within client 603 are hosted or not. It may be assumed for purpose of discussion that zone host 103, which is accessible to client 603 through ISP 102 and backbone 104, hosts the illustrated zones. In the zone-hosted embodiment, all firewall routing, zone management, and replication is performed at server-side. Within zone host 103 is illustrated a portal server 601, which is analogous in a logical sense to server 105 described with reference to FIGS. 1 and 4 above. Server 601 serves as a Web interface to, in this case users 604-606. Another server icon is illustrated within zone host 103 and represents any other included equipment that might be provided to perform services such as routing, zone management, zone configuration, and so on.

Zone host 103 has a zone policy base 602 that is partitioned per client, and may be further partitioned if more than one user is classed as one client. Policy base 602 contains zone policy and certain zone management options available to, in this case, administrators of IOM client 603.

It is noted herein that administrator 606 has a personal zone (P-Zone) that is divided into a private portion and a shared portion. Administrator 605 has a personal zone similarly divided into a private portion and a shared portion. Non-administrator 604 has a personal zone that is divided into a shared portion and a private/screened portion. There may be other zones attributed to each account however only a personal zone for each account is illustrated for purpose of discussion.

Administrator 606 has a private inbox IB where only mail addressed to the appropriate identity (A1) for that zone is deposited. Administrator 606 has 2 inboxes (IB) in the shared area or portion of the personal zone. One shared inbox accepts all messages addressed to family@home. The remaining shared inbox of administrator 606 accepts messages addressed to the identity of non-administrator 604, the messages deposited there by rule. Administrator 605 (A2) has a personal zone with 3 inboxes set up identically as that described above accept for the private inbox has the identity of A2@home attributed thereto, the at-home identity of administrator 2. Non-administrator 604 has one illustrated inbox where all messages to NA@home are deposited.

In a zone-hosted embodiment, Firewall routing, Zone management, and Message replication for the emails addressed to A1, A2, Family, and NA are functions performed within zone host 103. However for purposes of simplicity in illustration the 4 mentioned zone identities are illustrated in a rectangular box logically representing function performed in this case at portal 601.

Assume that email server 110 has forwarded (SMTP) an email addressed to A1@home to portal 601 for routing. The message A1@home is private (not to be shared) and is routed to the private inbox of A1 personal zone as illustrated by logical a routing path (dotted line). Note there are no replication rules that apply and no replication is performed. Similarly, a message addressed to A2@home is routed to the associated private 113 of administrator 605 with no replication.

For email messages addressed to the family identity=family@home, A1 and A2 have access to a copy of the email through a replication rule. The rule might state that for the identity=family@home, replicate to P-Zone (A1), shared Inbox (A1, A2), and to P-Zone (A2), shared IB (A1, A2). Following a hierarchy of administrative power, the message may be routed originally to administrator 1 and then replicated (R) to administrator 2. In this example, any email messages routed to non-administrator 604 (NA@home) are replicated to another shared inbox set-up in both P-zone A2 and identically in P-zone A1. IB NA then is a monitored Inbox that enables administrators 606 and 605 to see messages routed to non-administrator 604.

In a family situation, the above-described feature represents a parental control feature. Contact (sender) identities for those entities corresponding with NA@home are kept in a directory generic to P-zone 604 (non-administrator). The contacts being monitored may be replicated to the directories of P-zone A1 and P-zone A2 as "monitored contacts". After some given period of monitoring, either A1 or A2 may delete the contact from the appropriate contact list to nullify replication to that zone of emails to NA@home from the specific contact. Provided that both "parents" delete the contact being monitored from their directory future emails with that "approved" contact will be routed to a private/screened 113 in the P-zone of NA.

In one embodiment a sub-rule may also be provided that replicates a deletion action performed to delete a contact whereupon if either A1 or A2 deletes a contact related to emails routed to NA then the contact deletion will replicate to the contact list of the P-zone directory of the non-initiating parent. In this sense, zone-specific policy rules may be created based on identity/contact pairs or on identities or contacts separately. For example, if a contact sending mail to NA@home is to be banned, then instead of deleting the contact from a list of monitored contacts, it is moved to a contact blacklist. In this case the list is replicated back to the zone hosting service and published, for example, in policy base 602. Subsequent messages from that contact may be blocked or "killed" by the zone firewall regardless of client identity. Moreover, a contact may also be placed under partial ban. For example, A1 may decide that messages from a contact banned for P-zone of NA are still appropriate for sending to P-zone A2. For example, if a newsletter about drugs is periodically sent to identities A1, A2, and NA@home from the same contact then messages from the contact to NA@home (contact/identity pair) are the only ones blocked by firewall.

It will be apparent to one with skill in the art that zone architecture can be shared by more than one user and replicated for more than one user without departing from the spirit and scope of the present invention. In a case where there are multiple separate client applications distributed to machines or workstations on a LAN, for example, then integration and control by one or more administrators is still possible through policy-based administration. A separate integration tool may be provided for the purpose of integrating multiple client instances on separate machines that function, for example as a service business or the like.

Figure 7:
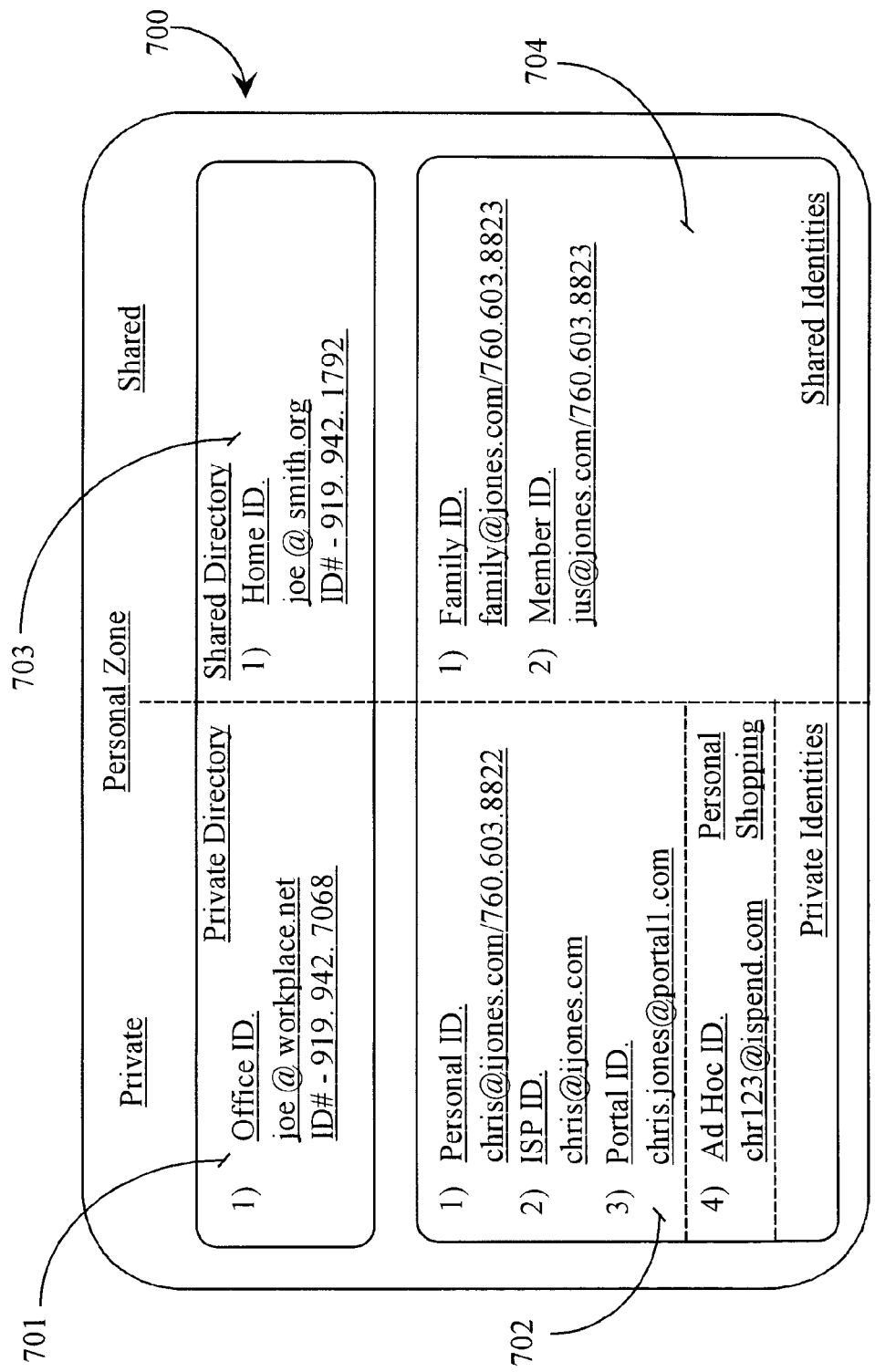
FIG. 7 is a block diagram illustrating architecture of a personal zone according to one embodiment of the present invention.

FIG. 7 is a block diagram illustrating architecture of a personal zone 700 according to one embodiment of the present invention. Personal zone 700 has a private directory 701 and, in this example, a shared directory 703. In one embodiment, private directory 701 and shared directory 703 are part of a physical single zone directory with designation of shared for the entries that are shared. In another embodiment, a separated shared directory may be provided.

Private directory 701 contains all of the contacts that have firewall access to the user's personal zone 700 where no other user has firewall access to view that portion of zone 700. Contacts may have a number of actual contact parameters attributed thereto. In this case 1 contact is illustrated as an office ID for a contact Joe Smith. Joe's office email address is joe@workplace.net. Joe's ID# for work is his workplace telephone number of (919)-942-7068. In one embodiment some number other than a telephone number may be provided as a contact ID number.

Joe, in this example, is an associated at work and also a family friend. Therefore, shared directory 703 lists Joe with respect to his home ID. Contact parameters listed for Joe's home ID are an email address joe@smith.org and a telephone ID #919-942-1792, which is a number for reaching Joe at his home. Personal zone 700 is analogous to personal zone 606 described above with reference to FIG. 6. It may be assumed that there are two inboxes associated with zone 700, a private inbox and a shared inbox.

Messages incoming to zone 700 from joe@workplace.net may be considered private to the user and therefore are routed to a private inbox. The fact that the private email contact for Joe is a work email may indicate that the collaboration between Joe and the user is private and not to be viewed by any other persons. However, in order for messages from Joe to be routed to the private inbox of the user, in one embodiment, he has to have access to one of the user's identities that are set up for the personal zone 700.

In this example, in private identities 702 there are 3 personal IDs set up for zone 700. In some embodiments there may be only one personal ID set up for zone 700. Personal ID #1 is chris@ijones.com with an ID# (telephone) of 760-603-8822. It is noted in this example that a second ID for Chris is the same email contact parameter as the personal ID. In this case the user's ISP email account is the same as his personal zone ID. In this case all email messages addressed to chris@ijones.com are replicated to the personal inbox of Chris as long as the sender is listed in private directory 701. Chris may import trusted contacts from is ISP account and paste them into directory 701 and in some cases into a replication directory (not illustrated).

A third private ID for zone 700 is listed as a portal ID chrisjones@portal1.com. All messages addressed to chrisjones@portal1.com will make it through to the private inbox so long as the senders are listed as contacts in private directory 701 and in some cases, in a replication directory. A replication directory contains contacts approved for replication to inboxes other than default account inboxes.

In a zone-hosted embodiment, the service entity can intercept email sent to various and unrelated email accounts held by Chris and can replicate only those emails where the sender is listed in directory 701 so that Chris may access all trusted email from one interface. However, in another embodiment zone 700 may be set up with a single identity that is unique such as chris@mypersonalinbox.com. In this case Chris may elect to physically "share" this identity with trusted contacts that normally send email using one of Chris's other identities by sending the contact an email where the identity is listed in the from field of the message.

If the contact chooses to use the identity but he or she is not listed in directory 701 then the firewall application might alert Chris that a non-listed contact has your identity. An option may be then presented for enabling Chris to add the sender address to directory 701. Moreover, a contact might be added virtually without giving the contact knowledge of a zone identity just for the purpose of having emails from that contact routed to the private inbox of zone 700 for viewing. In this case a special rule might be set up that directs all emails from a specific contact addressed to a generic identity (other account) to be routed to or replicated to the private inbox of my personal zone 700. This can be accomplished by equating identities. When replying to messages received from the contact the generic email interface would automatically be called up and the from address listed would be the email account address of the specific email account and not the personal identity of zone 700. There are many possibilities.

A fourth ID listed in private identities list 702 is an ad hoc identity. An ad hoc identity allows Chris to temporarily correspond with contacts through zone 700 where the contacts are not granted firewall access to a permanent zone identity. In this case, the ad hoc identity is chr123@ispend.com. This ad hoc identity allows Chris to do personal shopping, for example, from private zone 700. Chris may share the ad hoc identity with outside entities by sending them email using the identity such as when shopping. The entities receiving an email from the ad hoc identity perceive the identity to be the email address of Chris Jones and will correspond with Chris using that email address. Such entities will, temporarily, be added to private directory 701 with a constraint to the ad hoc identity (temporary contacts). At such a time when the life of the ad-hoc identity expires, the entities no longer have firewall access to Chris and are then purged or archived from directory 701. In this way, Chris may correspond with non-trusted contacts for any purpose without divulging a permanent email identity for example.

Zone 700 in this example has shared identities 704 and thus, presumably, a shared inbox. Shared identities 704 are identities that are also provided to one or more zones other than zone 700. A first listed identity in shared identities 704 is family@jones.com with an ID #760-603-8823, which may be the family telephone line accessible to anyone in the family. This identity may be a single identity for a family zone that is, in this case shared with zone 700. All emails addressed to family@jones.com are routed to the family zone. Certain ones or all of those messages may be replicated to a shared inbox of zone 700 provided the senders of those messages are listed in shared directory 703.

joe@smith.org with ID #919-942-1792 is a family contact whose messages sent to the family ID from the contact ID are routed to the family inbox and replicated, in this case to a shared inbox of personal zone 700. In this case joe@smith.org is listed in the directory for the family zone and in directory 703 (shared across zones). A second ID listed in shared identities list 704 is a family member ID jus@jones.com. with an ID # of 760-603-8823. This ID belongs to a family member Justin, for example, and might be a single ID for Justin's inbox of his personal zone. Certain contacts sending email to Justin are replicated to a shared inbox of personal zone 700 provided those contacts are listed in directory 700.

In this case, if Joe sends an email to Justin using jus@jones.com, that message will be replicated to zone 700, perhaps in a shared inbox adapted for the purpose. In this way Chris has access to all emails sent to Justin by Joe. If Chris decides that he no longer needs to see email from Joe sent to Justin he may simply delete joe@smith.org from shared directory 703. However, it may be that Chris also corresponds with Joe regularly using the contact identity joe@smith.org. In this case, the identity joe@smith.org would be retained in private directory 701. In this way messages from Joe to Justin would not be replicated because jus@jones.com is not a private identity in list 702.

In one embodiment, all email addressed to Justin's inbox might be initially replicated to a shared inbox accessible to Chris with the sender addresses automatically added to shared directory 703. After some monitoring, Chris may delete any of the contact listings thereby flagging that contact listed in Justin's personal zone directory so that further email from that contact is not replicated. Similarly, the deleted contacts may later be reactivated to directory 703 if Chris desires to resume monitoring email messages addressed to Justin sent from the deleted contacts.

Zone policy is what determines final routing of all messages. In one embodiment telephone numbers can be similarly treated. For example, all telephone calls from Joe at 919-942-7068 can be routed to 760-603-8822 even if Joe dialed 760-603-8823, which is the family telephone. In this case a rule may exist that specifies that all calls from Joe at his office should be private and should ring the private line of Chris (8822). This can be accomplished either at the level of the network (hosted zones), or by an in-home routing application integrated with a home computer network. Telephone routing may also include computer-based telephony applications as well without departing from the spirit and scope of the present invention.

Figure 8:
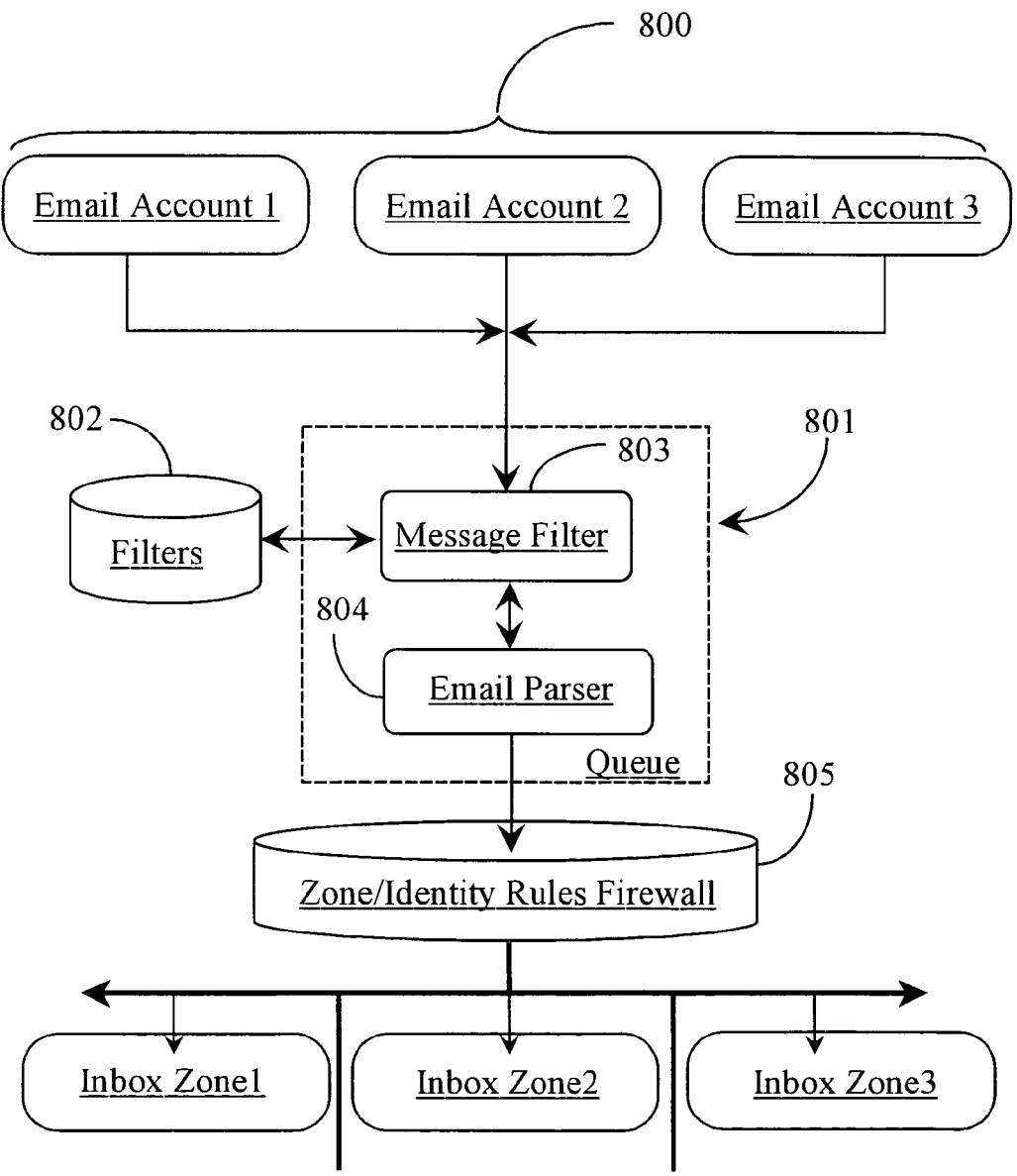
FIG. 8 is a block diagram illustrating a hosted email account firewall application according to an embodiment of the present invention.

FIG. 8 is a block diagram illustrating a hosted email account firewall application according to an embodiment of the present invention. In this example a user has three separate email accounts 800 set up according to normal protocols. These are an email account 1, an email account 2, and an email account 3. It is assumed for purpose of discussion that email accounts 1-3 have separate user email addresses associated therewith.

According to one embodiment of the present invention, activity related to all three accounts can be aggregated through a single interface using one method of the present invention in a zone-hosted embodiment.

At the bottom of this exemplary diagram there are three zone inboxes illustrated. By label, these are Inbox Zone1, Inbox Zone2, and Inbox Zone3. A user may elect that the service of the present invention intercept email from designated email servers of accounts email 1-3 wherein the senders of the intercepted emails are listed in directories of inboxes 1-3, which are zone specific. Contacts that have sent email to the user using a To: address associated with any of accounts 1-3 can be listed in any of directories associated with zones 1-3. Zones 1-3 might, in one embodiment, be adapted with any of email addresses from accounts 1-3 as user identities.

In such a case of hosted zones, the service accesses each of the email servers attributed to the user through accounts 1-3 and retrieves all email messages stored for the user that exhibit the sender identities listed as contacts in zone directories. These email messages may then be deposited in a message queue 801 provided for the user at the network service portal hosting the zones on behalf of the user.

A message filter 803 using may provide message filtering such as virus filtering and the like using a variety of known filters 802. This process may be optional in one embodiment because it might be assumed that since the user has listed the contacts in zone directories they would be those contacts that are trusted.

An email parser 804 then checks each email message for sender address (contact) and sends the information to firewall application 805. Firewall application 805 is analogous to firewall 119 described further above. Firewall application 805 may then check the sender address of a message against zone/identity rules to determine which zone inbox to route the message to. In a simplest case the rule is simply the zone that has the address listed. In this embodiment only the contacts that are listed in a specified zone directory can send messages that are redirected or replicated from email servers to the appropriate zone inboxes. In this case the user may open a zone and see all of the email from the listed contacts and can reply to those contacts from the zone inbox transparent to each contact.

In another embodiment zones 1-3 have single unique identities and do not include generic user email addresses attributed to other user accounts. In this case the user can import those trusted contacts into zone-specific directories and can send them email from a single interface containing the user identity for the zone that the user wants the contact to have firewall access to. If a contact chooses then he or she can send email directly to a granted identity address thus addressing the email server of the system, which then uses sender/identity pair matching to ensure that the email is routed to the appropriate inbox.

Firewall 805 is adapted to alert a user, for example, if a user identity has been compromised (zone policy violation alert). If a listed contact has shared a unique user identity with another user who then sends an email message to the user using the identity, the firewall alerts the user of a zone policy violation (correct user identity; non-listed contact). The user has an option of adding the non-listed contact or revoking the identity privilege of the contact that compromised the identity if that contact can be identified from a list of one or more contacts that had firewall access to the compromised identity. Email history might be useful in identifying such a contact. For example, the non-listed contact might be a CC or BCC of a message previously sent to the user from the contact that compromised the identity. Another option might be to simply blacklist the non-listed contact for future reference. Still another option might be to create an ad hoc identity and reply to the non-listed contact using the identity informing the contact that the old address is being replaced with a new one. In this case the non-listed contact may adopt the new email identity, which can be revoked at a later time.

In a preferred embodiment only trusted contacts have firewall access to any of the user's resident zone identities for email or other correspondence. In this respect all specific zone email identities are paired to email contacts that are granted firewall access to them. Firewall protections ensure that no messages are improperly routed. Outgoing messaging is also protected by firewall 805 in a preferred example. Zone identities in the case of email for example are all associated with a single email account that is useable with all of the created zone identities. A user can work from within a zone to send and receive email where the contact list is specific to that zone. A user may also work outside of a zone initially when sending email, however if the user types a contact or selects on from a contact list, the action by default causes zone identification by some graphic indication such as the appearance of a zone-specific icon or skin in the interfaces the user is working with.

Figure 9:
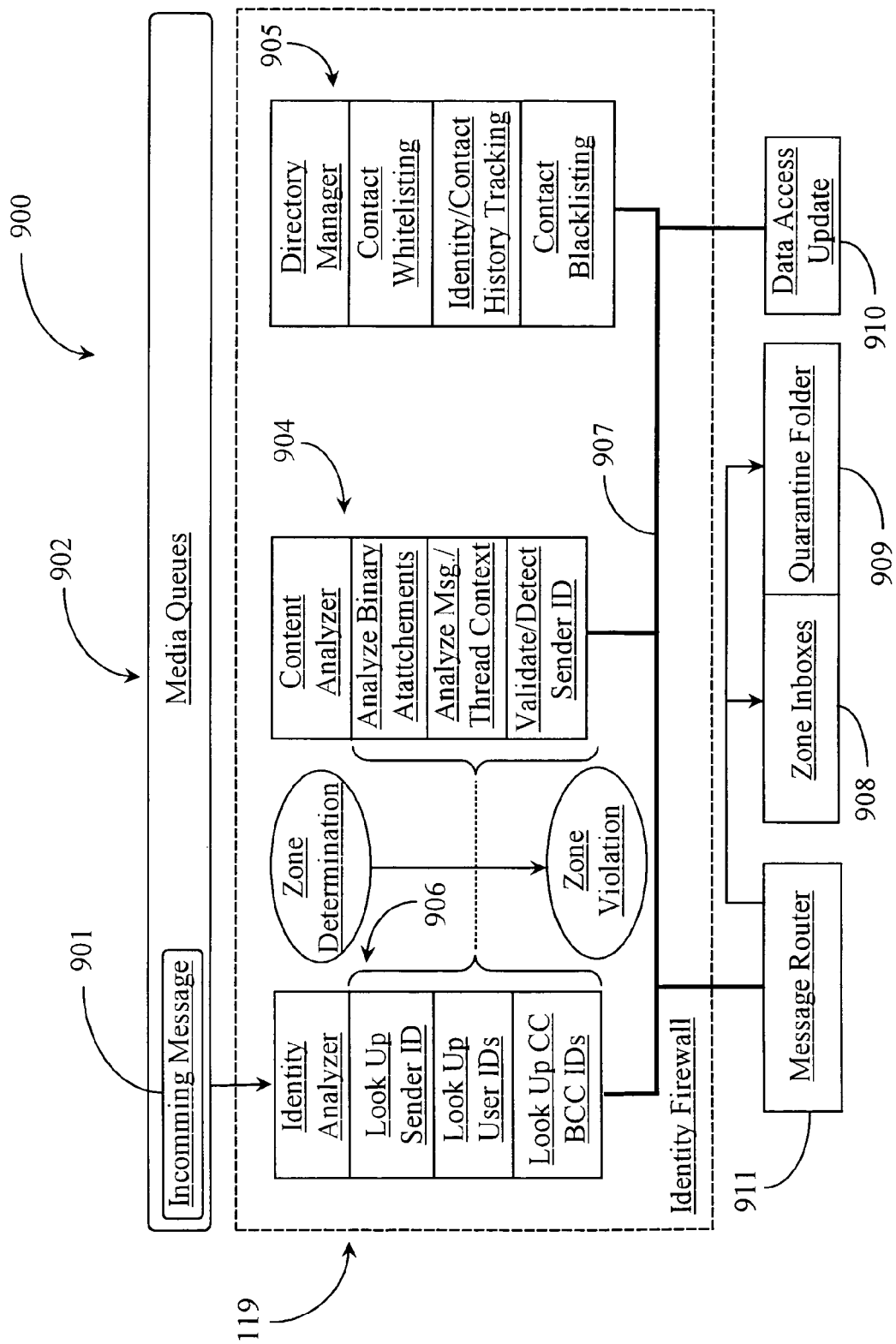
FIG. 9 is a block diagram 900 illustrating components and function of an identity oriented firewall application 119 according to an embodiment of the present invention.

FIG. 9 is a block diagram 900 illustrating components and function of an identity oriented firewall application 119 according to an embodiment of the present invention. In a preferred embodiment of the present invention, IO firewall 119 controls interaction flow in both zone-hosted and non-zone-hosted embodiments.

In this example, a plurality of interaction or media queues 902 are provided to queue incoming interactions. Queues 902 can include, but are not limited to an email queue, a voice mail queue, a newsletter queue, a telephony queue, a presence queue (IM etc.) and so on. A media handler (not illustrated) may be provided, in one embodiment, for each distinctly different type of media supported by the system. A media handler may be adapted to recognize any supported interaction of media type and to ensure that the correct media type enters the correct queue type according to zone policies enforced by firewall 119.

In one embodiment of the present invention, queues 902 can be implemented with a single interaction queue that sorts and prioritizes all incoming interactions. In a live embodiment where a user is connected for communication, queues can be adapted to queue live calls waiting and so on.

Firewall 119 is the main application between any sender of a media interaction and the final user destinations for the interactions whether they are live interactions or queued messages or the like. Firewall 119, in this example, has an identity analyzer 906, a content analyzer 904, and a directory manager 905. An incoming message 901 is illustrated waiting to be processed in queue(s) 902.

Identity analyzer 906 is a software component that attempts to determine the identities associated with any incoming or outgoing message. For example, identity analyzer begins processing an incoming message by looking up the sender identity or ID of the entity responsible for sending the interaction. Identity analyzer also looks up the user identity, which is the destination ID for message 901. In many instances all of the information required for firewall 119 to successfully route message 901 might be determined by identity analyzer 906. However, content analyzer 904 can be consulted in an event that more information is required to successfully route message 901.

In an example of email, message 901 should have a sender ID and a user ID (destination of message). The unique sender ID and user ID combination may define a specific zone inbox, illustrated herein as inboxes 908, as an appropriate destination for message 901. In this case the user ID is the zone-specific ID and the sender ID is listed in the approved contact list in the particular directory for that zone. Firewall 119 determines which zone or zones is appropriate for message routing and determines if there are any zone violations.

If the sender ID is not correct for the user ID found in message 901, for example, then firewall 119 attempts to further analyze message 901 before triggering a zone policy alert or an outright zone violation. One additional step is to check CC and BCC identities in the message. If these identities are listed as approved contacts for a particular zone, then a zone policy alert (short of a violation alert) may be sent to the user asking the user for permission to ad the new sender to the contact list for the zone. In this case, the new sender was given the user's identity either directly or indirectly and the user is asked to arbitrate routing of the message. If the user is not available then the message may be filed, after a period of time into a quarantine folder of the inbox. Likewise, if a sender approved as a contact for a particular zone, but uses a user ID of another zone firewall 119 attempts to resolve the issue by checking if the user is a contact in the other zone. If not, then there may be a zone policy alert. It is noted herein that a fact of a sender being listed as a contact for a particular zone may by default enable routing of the message to the zone if there are no other possibilities.

In one embodiment message 901 may have more than one user ID listed as a destination. In this case, firewall 119 will check sender ID against zone directories of each zone and if found in a particular zone directory then that zone receives the message. It is important to note herein that in some cases with some media types may result in no detectable sender ID such as a blocked telephone number. However, a user ID for a zone might include a telephone number with a unique extension identifying the zone. In any case, a user ID parameter must be present in order for a message to reach queue(s) 902 to be processed for further routing.

If for some reason zone policy cannot be determined because identity analyzer 906 cannot determine sender ID, then content analyzer 904 may be called to help determine origin of the message. For example, a reply related to an ongoing communication between several parties might be allowed if through content analyzing, it is determined that the message belongs to a particular message thread specific to a particular user zone and the user wishes to accept all content generated by the thread.

In one embodiment where binary attachments are involved such as those that might be taken from a binary news server, then content analyzer can be called on to verify content of the attached file as content that the user is interested in or has subscribed to. In this case, a zone violation might occur if a content poster identity is found in a zone directory as an approved contact but the content does not fit an approved profile of content allowed for download. It might be that a malicious user has compromised the poster's identity and is attempting, disguised as the legitimate poster, to post undesirable material. In a case where a user might download content of any kind, content analyzer might be called by default to verify content against a content profile accepted by the user for a particular zone.

In some cases, a contact might be detected and/or validated as legitimate for a zone according to content analyzing. For example, if a contact is not listed for a particular user zone according to use of user ID, but the content analysis shows that the attachment could only have come from the approved contact then the correct contact information for the specific zone can be implied beyond reasonable doubt. Encryption keys, digital signatures, and other forms of validation can be associated with a particular contact so that if the contact uses an unlisted or otherwise unknown parameter, the contact may still be determined and validated.

In a preferred embodiment of the present invention, content analyzer 904 functions as a back-up component to identity analyzer 906. However, in some embodiments, content analyzer 904 is called by requirement where binary attachments are concerned such as to verify legitimacy of a contact listed as a news group contact, for example.

In this example, directory manager 905 controls contact whitelisting, contact blacklisting, and manages identity contact history tracking. For example, new identified contacts that have been validated for a zone, but not previously listed in a zone contact directory can be added to a zone directory and provided as a whitelisted contact. Similarly, contacts found to have compromised a zone identity or found to be responsible for undesirable content can be deleted from zone directories and added to a blacklist.

Identity analyzer 906, content analyzer 904, and directory manager 905 are connected in this example by a logical bus structure 907. A message router 911 represents routing function for all interaction. Router 911 represents final destination routing caused by firewall 119, more particularly zone determination and inbox specification. It is noted herein that router 911 may represent different routing applications according to various embodiments. For example, in a zone-hosted environment there my be one or more physical routers involved in interaction routing depending on design and media types supported. In a non-hosted environment like, for example, a desktop implementation, routing applications normally in use or set-up for a specific media type may be supported. In all cases however, final zone and inbox sorting is enforced by firewall application 119.

In practice of the present invention message flow generally follows a path beginning with identity analysis then content analysis (if required) followed by directory management (if ordered). Messages that are zone policy violations, including spam and other rejected messages may be sorted accordingly. In this example, each zone has a quarantine folder 909 provided therein and adapted to receive messages that otherwise cannot be successfully filed according to zone policy. A data access and update module enables a user, through an interface, to view and edit current zone policy and to add any explicit zone policy rules that may be created to override certain policy issues.

One with skill in the art will recognize that in the case of firewall 119 identities that make up contact or sender information and user or zone-specific information will take the form of normal contact parameters of the media types supported. Email identities will be of the form of email addresses for example while telephone identities will be in the form of a telephone number. All routable media types can utilize zone specific variations for user identities and in the case of a peer using the software of the present invention, sender identities (contact identities from the user perspective) may be as varied as user identities further aiding in identity pair management.

Figure 10:
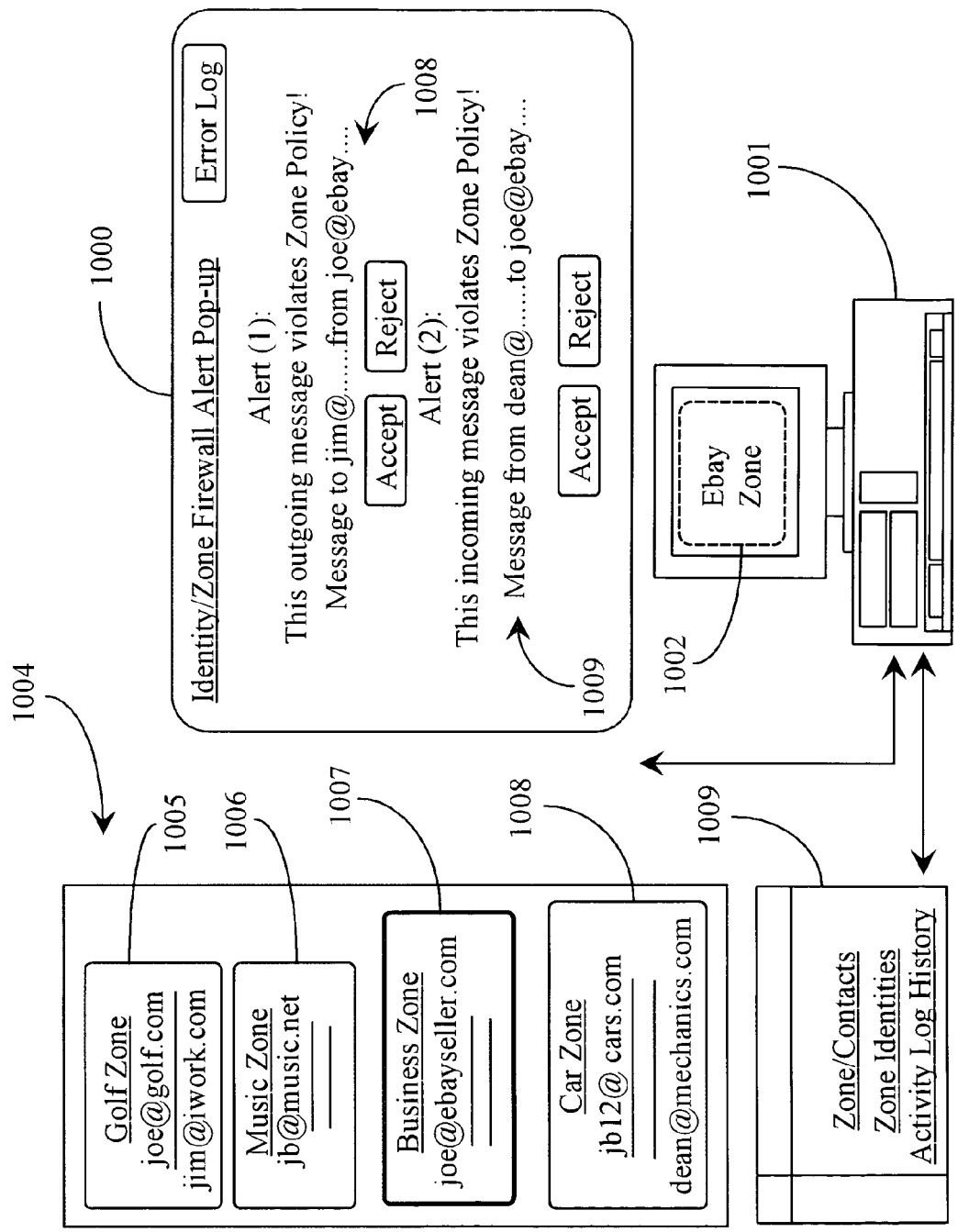
FIG. 10 is a block diagram illustrating firewall alert features according to an embodiment of the present invention.

FIG. 10 is a block diagram illustrating firewall alert features according to an embodiment of the present invention. A user 1001 (computer icon) may accept messages in a zone-specific manner and may send messages in a zone-specific manner according to identity oriented zone policy enforced by firewall.

In this example, user 1001 is working from within an exemplary zone 1002 labeled Ebay, which for discussion purposes has an email identity of joe@ebayseller.com. In this example, email is one of communication media types supported and sender/user Ids are of the form of email parameters.

A collection of exemplary zones 1004 belonging to user 1001 is illustrated at left in the diagram and contains a golf zone 1005, a music zone 1006, a business zone (Ebay) 1007, and a car zone 1008. User 1001 has contact directories for each zone and identities for each zone. Business zone 1007 is the zone currently being used. This example is of a desktop implementation of the software of the invention that is not zone-hosted.

A data store 1009 is provided to contain all of the actual zone data and activity history. Data store 1009 can be provided in dedicated fashion from memory resources generic to the computer of user 1001. The data may be provided, for example, as a dedicated portion of the user's hard drive. In this case, firewall implementation is on the computer. In another embodiment the firewall application and data may be hosted on an appliance or peripheral, perhaps a physical router and may not be present on a PC.

Each of the zones owned by user 1001 has a user identity, which is some form of joe i.e. joe, jb etc. A user identity for a zone may be permanent (lasting the life of the zone) or temporary as in an ad hoc identity. For example a user identity for golf zone 1005 might be joe@golf.com. A user identity for music zone 1006 might be jb@music.net. The identity for business zone is joe@ebayseller.com as described above. The identity for zone 1008 might be j12@cars.com. These identities are one that user 1001 is willing to share with certain contacts on a permanent or, in the case of ad hoc, temporary basis.

A pop-up alert 1000 represents an identity/zone firewall alert pop-up that may be sent to alert user 1001 of any violations. Pop-up alert 1000 may be displayed at any time of need or convenience on the display of user 1001. In this case, pop-up alert 1000 contains more than one alert for discussion purposes. Typically one alert may only contain reference to a single violation of zone policy.

Because user 1001 is working from within zone interface 1002 (email) of zone 1007, his interface has some graphic representation of the specific selected zone. Alert 100- contains two alerts illustrated. These are an outgoing message alert 1008 and an incoming message alert 1009. Alert 1008 (also labeled alert 1) reads that a message user 1001 is attempting to send violates zone policy. This may be because the user is attempting to send email to a contact not listed in a directory. The firewall breach is based on a non-listed contact. More particularly, joe@ebayseller.com has attempted to send an email to someone that is not listed in a directory of zone 1007. Pop-up 1000 can immediately be generated because the system knows that Joe is already working within zone 1007.

In this case Joe sends a message to a contact jim@iwork.com, which is not listed in a directory for business zone 1007. Before the email message is queued for send, alert 1008 is displayed and has an option of accepting the email as addressed or rejecting the email and re-selecting a proper contact or zone for emailing the message. If user 1001 accepts the message as addressed then jim@iwork.com might be added to a directory specific to business zone 1007 for future reference.

If user 1001 rejects the message as written then further options are provided accordingly. For example, user 1001 may have intended that Jim is the correct recipient. In this case preserving Jim as the contact in the message may cause the interface to change graphically to represent golf zone 1005 listing Jim as a contact. If golf zone and one other zone list Jim as a contact using he same email identity then a zone list may be presented so that user 1001 may select the appropriate zone, hence user identity for the message.

Zone alert 1009 also labeled alert 2 reflects an incoming message violation where a message is received from dean@mechanics.com that is addressed to joe@ebayseller.com. The violation here is that Dean is not listed in a directory for business zone 1007. User 1001 may arbitrate the violation by adding Dean to a contact directory for business zone 1007 or the message can be rejected.

If the offending message is rejected in this case, a problem still remains as to how the contact dean@mechanics.com became aware of the user identity joe@ebayseller.com. CC or BCC records on any activity history conducted with the address dean@mechanics.com through zone 1008 may shed some light if a contact found in CC or BCC records is one that is also listed in the directory of business zone 1007. It is possible that the contact may have shared the user identity information with the owner of dean@mechanics.com. One option is to send an email to dean@mechanics.com directing the recipient not to use the identity or be blacklisted from all zones. Also, the contact identified as a possible source for the identity leak can be contacted and if uncooperative, blacklisted. In case the contact that compromised the user's Ebay identity cannot be distinguished from other contacts listed in business zone 1007 using communication history records, then the user still has an option of changing the identity for the zone.

In all embodiments of the present invention, a contact cannot reach a user through any zone wherein the contact identity used in the media type to gain firewall access is not listed in a contact directory of the zone. Other than explicit rule such as for example "replicate all messages from user@abc.net to all inboxes", firewall 119 adheres to implicit identity rules existing according to current zone directories and identities.

It is noted herein that contacts using shared identities reach user facilities like email servers and the like directly. However contacts that do not have firewall access to zone identities may still have their communications routed according to contact listing in zone directories if such communication is intercepted by ordered forwarding or by password protected third party access as in the case of generic email accounts. In a zone-hosted embodiment, all communications to any user-related identity of any supported media type can be zone managed.

Figure 11:
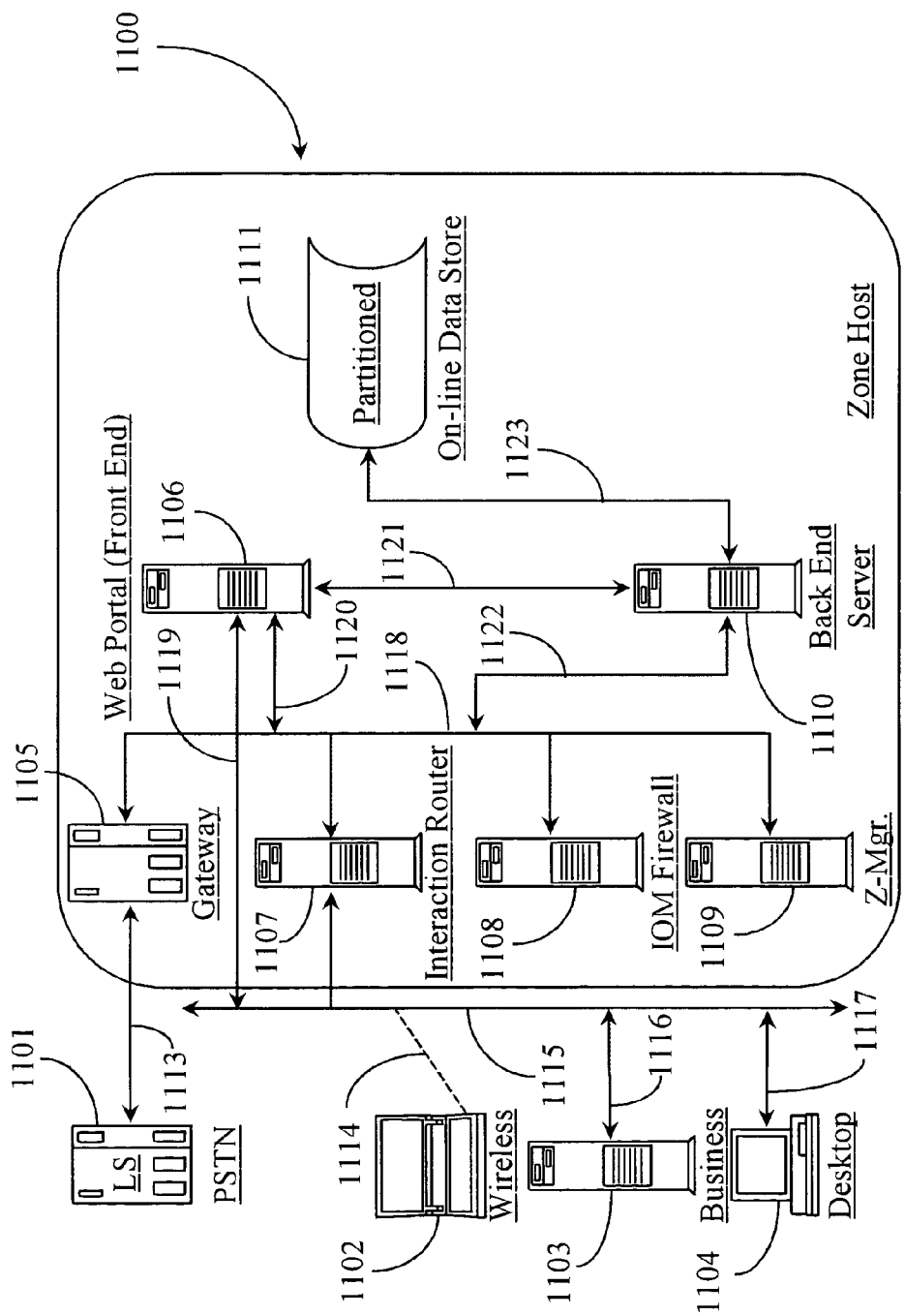
FIG. 11 is an architectural overview of a Web-based service adapted for third-party zone hosting according to an embodiment of the present invention.

FIG. 11 is an architectural overview of a Web-based service adapted for third-party zone hosting according to an embodiment of the present invention. A zone-hosting service party 1100 is illustrated in this example as a service organization that can provide third-party interaction routing, and zone management services for users on a private level or on a business level. Service provider 1100 is analogous to zone host 103 described with reference to FIG. 1 of this specification. In this example, exemplary internal equipment and exemplary connection equipment types are illustrated to show separated function.

A PSTN switch 1101 is illustrated in this example and represents any telephony switch within the PSTN network local to party 1100. The presence of telephony switch 1101 illustrates that clients may access third-party services offered by zone-host 1100 through the PSTN network and a gateway 1105 by way of a telephony trunk 1113. Gateway 1105 can be an SS-7 gateway or any other known gateway adapted to bridge telephone calls between telephone and data-packet networks. Gateway 1105 may be maintained, in one embodiment by the enterprise hosting zone services. In another embodiment, gateway 1105 is leased from a telephone service company or a network provider. PSTN switch 1101 may also direct incoming voice calls destined to clients that subscribe to zone-host services.

A laptop computer icon 1102 is illustrated in this example and represents client capability for accessing services through a wireless connection 1114 and an Internet or other WAN backbone 1115. Icon 1102 represents a wireless computer in this example, but may also represent a wireless cellular telephone capable of network browsing or any other network-capable wireless device.

A business server 1103 is illustrated in this example and represents any business-to-business (B2B) server. Server 1103 may access zone host 1100 over a network access line 1116 and network backbone 1115. Server 1103 can be an automated system that accesses zone host periodically or one that maintains a session-connected state with zone-host 1100 over a period of time. Zone host 1100 may manage interaction routing and zone management services for many individuals of a business that maintains one or more servers 1103 that enable identity-managed access and, in some cases live session interaction between clients and associates of the business and the business itself using zone host 1100 as a proxy interaction routing and zone-management entity. B2B server 1103 may also be a business-to-client (B2C) server or a client-to-client (C2C) server such as a community portal application practicing presence protocols without departing from the spirit and scope of the present invention.

A computer desktop icon 1104 is illustrated in this example and represents individual client access to zone host 1100 through a network-access line 1117 and network backbone 1115. Desktop computer 1104 represents any client or client group accessing services provided by zone host 1100 through network access methods such as digital subscriber network (DSL), dial-up methods, or other known network access methods using dedicated or shared physical lines.

Zone host 1100 maintains at least one web portal 1106 through which services may be accessed. Web portal 1106 presents client information according to zone policy enforced by IOM firewall application 1108 represented in the form of a server in this example. Portal 1106, in a preferred embodiment, is a server which may be adapted for HTML, WML, and other data presentation protocols enabling display and data access to clients operating user interfaces adapted for the purpose according to method, equipment type, and protocols used by the client.

Zone host 1100 has an interaction router 1107 adapted for the purpose of routing incoming interactions according to zone policy enforced by IOM firewall application 1108. Router 1107 is illustrated logically as a standalone piece of equipment in this example; however in actual practice routing applications may be provided as dedicated applications serving specific media types and may be distributed over more than one physical node. For example, a router may be provided and dedicated to incoming email in the form of a mail service. Another routing application may be provided and dedicated to route telephony calls. VoIP calls may be handled by yet another routing application. The inventor illustrates router 1107 as a dedicated node for purpose of clearly separating and explaining routing function from other functions enabled within host 1100.

IOM firewall 1108 enforces all identity oriented routing and sorting of messages and in some embodiments, live sessions according to zone policy. A zone manager application 1109 is logically illustrated herein and is adapted to provide zone and identity creation and management services.

Portal 1106 is, in this example, connected to a back-end data server 1110 by way of a high-speed data connection 1121. Server 1110 is adapted to maintain and serve data relating to interaction and communication activity recorded for clients of host 1100. Data server 1110 has access to an on-line data store 1111 that is partitioned according to existing clients of host 1100. In one embodiment, data store 1111 is internal to server 1110 and maintains the actual data relating to communication activity for clients. In one embodiment, the functions of data store 1111, back-end server 1110 and portal 1106 are hosted in a single node. In another embodiment there may be more than one portal server as well as more than one back-end data server 1110 and data store 1111.

It is noted herein that the illustrated equipment types of this example are logical implementations only and should not be construed as requirements in form or function for the practice of the present invention. For example, data service, portal services, interaction routing, IOM firewall protection, zone management services, and network gateway services may all be implemented in one or more than one machine in a variety of combinations without departing from the spirit and scope of the present invention.

In practice of the present invention according to one embodiment, clients represented by network-capable devices such as wireless device 1102, and desktop device 1104 have direct network access to portal server 1106 by way of backbone 1115 and server access line 1119. In a preferred embodiment server 1106 is a Web portal and the operating network is the Internet network. In this case, a client operating a device such as laptop 1102 forges a wireless connection to the Internet, for example, through a wireless ISP and navigates to server 1106 and further to a particular presentation page maintained for the particular client and accessible through normal Internet address protocols such as URL and URI protocols.

Once client 1102 is in session with server 1106, he or she may access and view messages and other communiqués that have occurred since the last time the client logged into the service. A client represented by desktop computer 1104 also has direct access to portal 1106 through UI function and network navigation although in a tethered (wired) embodiment. Clients operating wireless devices and tethered devices can, in one embodiment, conduct live interactive sessions such as telephony or VoIP sessions through portal 1106 during a period of time when they are connected in session with portal 1106.

Business server 1103 may connected to portal 1106 using an automated interface adapted to automatically update messages and other activity for multiple clients whose zone structures are represented both in server 1103 and in data store 1111. In one embodiment a separate portal function may be provided and specially adapted to communicate with server 1103 using a machine-readable mark-up language like an XML-based language. In this same embodiment, live interaction may be conducted as well.

Zone host 1100 receives incoming messages and, in some embodiments, live voice calls on behalf of subscribed clients and routes all of those incoming communiqués based on zone policy set up for the subscribed clients. For example, incoming voice calls may arrive at host 1100 through gateway 1105 from anywhere in the PSTN network. Interaction router 1107 treats each voice call according to zone policy enforced by IOM firewall application 1108. Router 1107 has a logical network connection to firewall application 1108 by way of internal data network 1118 in this example.

Router 1107 consults firewall application 1108 for each incoming communiqué. Firewall application 1108 is responsible for determining identities of the incoming communiqués, more particularly the senders ID (calling party) and the destination ID (receiving party). For asynchronous calls (voice messages) that are not part of live two-way communication between parties, router 1107 routes the messages to back-end server 1110 where they may be queued in the appropriate inboxes (voice message boxes) of the identified clients according to current zone policy of the client.

Subscribers may periodically access portal server 1106 to check their voice messages and to download them to their devices. In typical fashion a client would login to server 1106 and provide authentication. After providing authentication, a portal interfacing Web page is presented to the client. The Web page has at least summary information of current and past activity conducted on behalf of the client including indication of whether voice messages are present and what zones and inboxes any existing messages belong to. The client may sample voice messages by browsing zone architecture presented in a navigable tree or by short-cut navigation to the inboxes identified as containing new messages. The client may then download all or selected voice messages to his or her duplicate zone architecture contained on his or her access device. Downloading voice messages is conducted according to current zone policy, which may include replication orders for replicating certain selected messages to particular inboxes or other folders contained on the user's device or to a folder on a selected other device connected to a network that also includes the user's device. A zone manager (Z-Mgr.) 1109 may enforce replication using a message replication application similar in function to application 202 described with reference to FIG. 2.

It is noted herein that an inbox or folder designated to receive a replicated message does not require representation by zone architecture for the client at the server side. All that is required is that the server knows the destination of the designated folder on the user device, which can be made known in a download request. When a user requests download of voice messages for example, portal server 1106 retrieves the appropriate data from server 1110 over data link 1121.

In one embodiment, a client may access portal 1106 from a PSTN-based telephone through gateway 1105. In this embodiment gateway 1105 functions as a proxy interfacing node holding the live call and interfacing with portal 1106 over a special data link 1120 provided for the purpose. IVR technology may be used to provide a client with means for accessing specific information. Client identities for voice may include telephone extensions that vary for each zone. For wireless cellular clients, wireless markup language (WML) and other wireless data presentation languages can be used.

In one embodiment voice sessions may be conducted between clients and callers wherein the calls are routed live through portal 1106. In this case an incoming voice calls at gateway 1105 may be routed according to identity information to a telephony application operated by a subscribing client. The calls are firewall protected, as are voice messages and identities for the client may include Enum identities assigned to client voice applications or telephony peripherals. In the case of routed live sessions Portal 1106 functions as a call bridge and establishes the call connection between the caller and the client's accessing device.

Email, news letters and other message types including voice messages and live voice sessions may arrive at zone host 1100 from any network-capable device connected to network backbone 1115. Interaction router 1107 routes each message type according to zone policy enforced by firewall application 1108 as with all other communication. Messages are accessible through portal 1106 according to zone policy and live sessions may also be conducted as previously described.

One with skill in the art will recognize that router 1107 is represented logically in this example. In one embodiment there are separate media handlers for each supported media type. The media handlers in such an embodiment are dedicated handlers that are responsible for identifying particular media types of communiqués incoming and for directing routing of those using the appropriate routing applications.

Zone manager 1109 enables clients to construct and organize zones and in some cases to create user identities for the constructed zones. In one embodiment, a separate identity creation service is provided for the purpose of creating user identities for zones and any ad hoc identities for outgoing communications. A user may access a zone management Web form or page from portal server 1106. In one embodiment, zone manager 1109 is accessible without requiring portal connection. In such an embodiment, all modifications and additions of zone architecture parameters can be updated directly from server 1109 to server 1110.

In one embodiment, all incoming and outgoing communication between a client of host 1100 and other parties is routed through zone host 1100. In another embodiment clients may select a level of zone hosting that may provide routing services for only incoming communication. In still other embodiments some of client zone architecture may be serviced and managed while some of the same zone architecture is not hosted.

In this particular example of zone hosting, router application 1107 is essentially dumb meaning that it cannot enforce complex identity oriented policy across one or more media types. Firewall application 1108 outputs routing instruction to router 1107 whichever media type is involved. Primarily, firewall application 1108 is concerned with identities and how they interpolate with zone policy. However as described with reference to FIG. 9 above application 1108 can also analyze attachments, message threads, and may also check email CC and BCC identities and identities included in other recipient list types that may apply to other broadcast-capable mediums like RSS and IM.

It will be apparent to one with skill in the art that identity oriented messaging and live interaction may involve several media types supported by a particular clients with multiple identities used for each of those supported media types. In a business environment a server such as server 1103 can be adapted to retrieve messaging for multiple clients having multiple zone structures and identities. Live interaction routing is possible in both business and single user embodiments. In a preferred embodiment of the present invention zone hosting can be applied to one or more zones that are part of client zone structure and can support one, a combination of, or all of the media types and protocols described with reference to FIG. 1.

Figure 12:
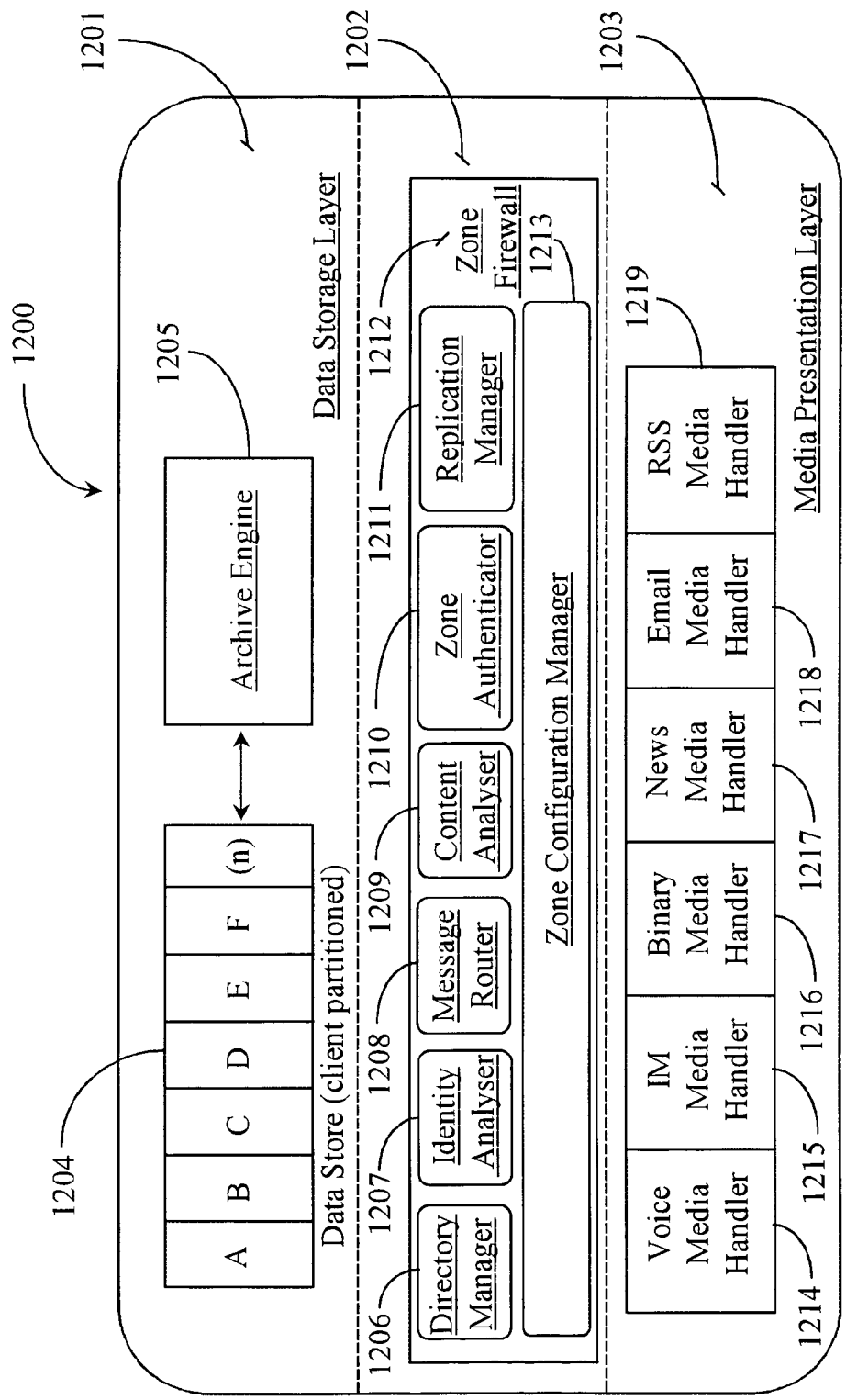
FIG. 12 is a block diagram illustrating software layers and components according to one embodiment of the present invention.

FIG. 12 is a block diagram illustrating software layers and components according to one embodiment of the present invention. In this embodiment software 1200 is illustrated in three basic software layers. These are a data storage layer 1201, a zone firewall layer 1202, and a media presentation layer 1203.

Data storage layer 1201 has a data store 1204 partitioned for clients A-(n) and an archive engine 1205 for compiling old history data for clients and storing them in an organized fashion for later access if necessary. Layer 1201 is responsible for maintenance and service of activity data for clients of the IOM service.

Layer 1202 is responsible for establishment and maintenance of zone architecture and message replication as well as identity oriented management of communication. In addition to IOM services layer 1202 also manages contact directories, white listing, black listing, and communication history tracking. In this embodiment, zone configuration manager 1213 is included in the domain of firewall application 1212. Also included within the domain of firewall application 1212 is the replication manager 1211. Firewall 1212 has, in addition, a directory management function 1206, an identity analyzing function 1207, a message routing function 1208, a content analyzing function 1209, and a zone authenticator 1210.

Media presentation layer 1203 is responsible for presenting media to client subscribers upon request and may in one embodiment serve as interceptors of messages incoming for processing. In this regard a plurality of dedicated media handlers work to identify communication that is incoming and to identify communiqués stored on behalf of any client. Media handlers provided in this example include but are not limited to a voice handler 1214, an IM handler 1215, a binary handler 1216, a news handler 1217, an email handler 1218, and an RSS feed handler 1219. As constructed in this example, application 1200 can be implemented on a single machine such as a desktop computer. In a desktop embodiment, presentation layer 1203 provides one or more UI views of activity conducted by a client according to zone policies. In a server-side hosting embodiment, layer 1203 presents a portal interface (Web page) for each subscribing client or client group.

It will be apparent to one with skill in the art that software 1200 can be provided in various configurations including some or all of the described components without departing from the spirit and scope of the present invention. Moreover, software 1200 can be implemented on a single machine or it can be distributed over more than one machine without departing from the spirit and scope of the present invention. Likewise, software 1200 may be provided as a desktop application that may vary in design and implementation from a server-based version used in a zone-hosting embodiment.

Figure 13:
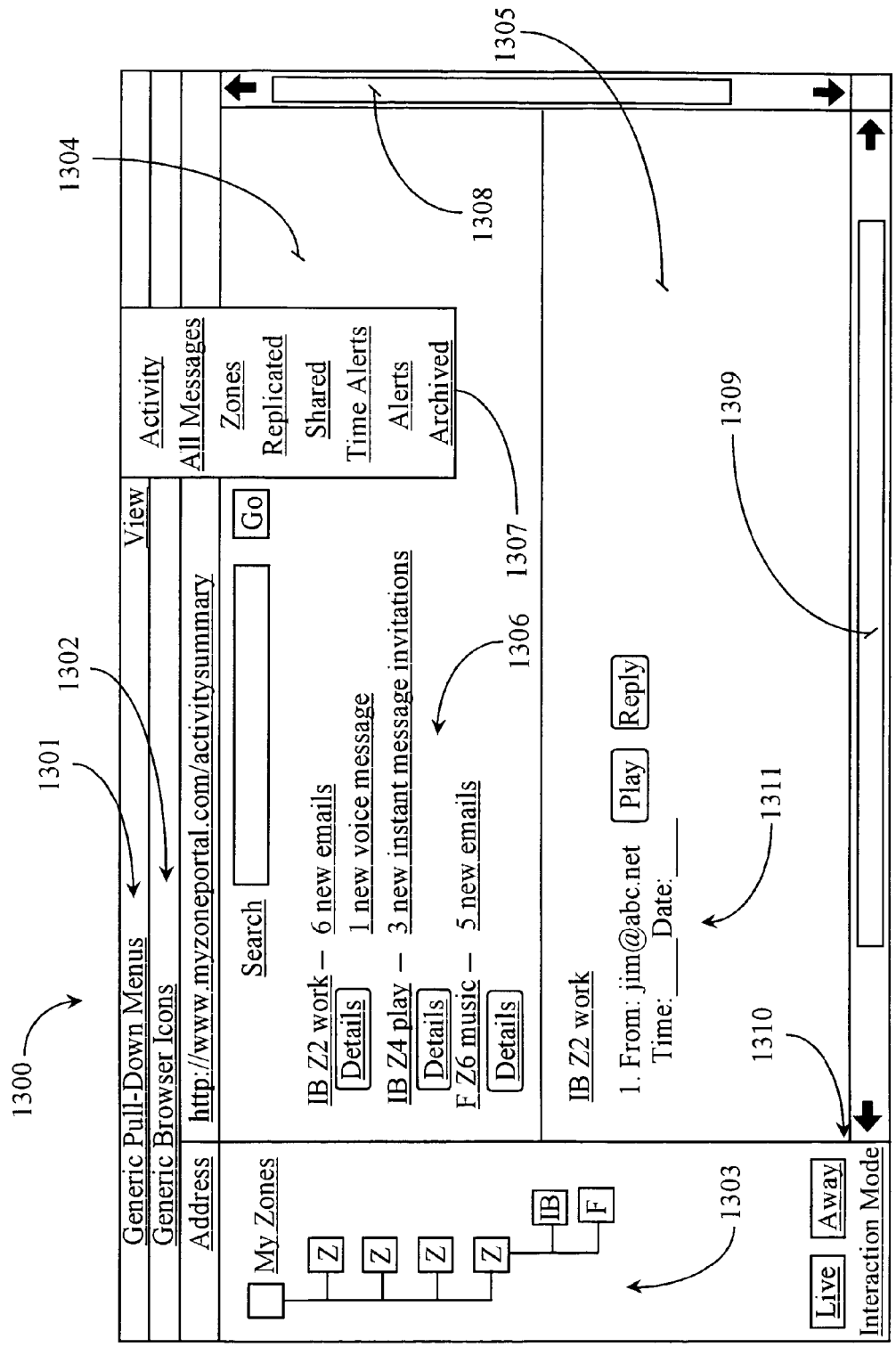
FIG. 13 is a block diagram illustrating portal interface functionality according to an embodiment of the present invention.

FIG. 13 is a block diagram illustrating portal interface functionality according to an embodiment of the present invention. A portal interface page 1300 is logically illustrated in this example to show exemplary functions that are provided to clients of a zone hosting service according to a preferred embodiment of the present invention. Interface 1300 is personalized to particular subscribed clients having access to it. Interface 1300 enables IOM management and may be provided according to several known markup language formats used to enable access and manipulation of data through various possible access devices. Some examples include the HTML-based formats and wireless access protocols (WAP) including WML.

In this example, interface 1300 is in the form of a browser frame supporting all of the generic browser pull-down menus 1301 and all of the generic browser icons 1302. Like all browser frame architectures, there is an Internet or network navigation address window or bar, which in this example reads http://www.myzoneportal.com/activitysummary illustrating the personal nature of the Web page to a client. Portal interface 1300 may be preceded in delivery to a client by an appropriate login page or procedure.

Interface or portal page 1300 has a zone navigation tree 1303 provided in a hierarchical format familiar to most operating systems. Tree 1303 enables direct navigation to inboxes and folders that may be associated with user zones that are established for the client. At the top of tree 1303 is an icon labeled My Zones. Activating this icon such as by mouse over or mouse click reveals zones, labeled Z in this example. By selecting a desired zone, inboxes (IB) and listed folders (F) are revealed.

Interface 1300 has a viewable workspace 1304 adapted, in this example, to display new activity that has occurred across all zones since the last user login. Workspace 1304 has a familiar search input window typically provided by a third-party search engine. When online a user may search the Web or prevailing network through this interface. Activity summary information 1306 is, in this example, displayed for view within workspace 1304. Activity 1306 represents a summary of all of the activity across hosted zones that has occurred since the last user login was performed as was stated above.

In this example it is shown that the current client has 6 new emails in an IB for zone 2 (Z2), which is a work zone in this case. There is also one voice message queued for the client in the same inbox. A selectable icon labeled Details is provided and associated with the information for zone 2 so that a client may immediately call up the details and any function for viewing and downloading messages.

In this example, further activity 1306 is displayed and associated to a zone 4 (Z4), which is a play zone. There are 3 new instant message invitations waiting in an IB associated with Z4. Also displayed are 5 new emails that were deposited in a folder associated to a zone 6 (Z6), which is a music zone in this example. Activity summary information 1306 can be configured to list all new activity that has occurred according to all supported media types not limited to email messages, voice messages, binary files, RSS feeds, news letters, chat invitations and other presence alerts, and so on.

Portal interface 1300 has a second viewable workspace 1305 adapted in this case to display details from the summary activity displayed in workspace 1304 through interaction with one of the displayed details icons. In this example, a user has highlighted the "one new voice message" line in summary information 1306 associated with the work zone (Z2) and activated the details icon. In the details workspace 1305 the IB and Z2 heading appears. The detailed description 1311 of the new voice message appears including identification of whom the message is from (jim@abc.net), and the time and date the message was received. In this case, a play icon and a reply icon are provided within workspace 1305 and associated with message 1311. The play icon initiates audible rendering of the message and the reply icon invokes an appropriate hosted application a user may manipulate for replying to the message. Such an application may be a version of an IMAP email interface that is hosted by the service and enhanced to allow voice messaging. In one embodiment, after sampling viewing activity summary 1306, a user may elect to synchronize the information with his or her accessing device. Afterward, a user may reply to messages and the like off-line using local applications instead of using server-based applications.

Interface 1300 has scroll functions represented logically in this example by a vertical scroll bar 1308 and a horizontal scroll bar 1309. Although it is not illustrated herein, each displayed information window or workspace may be separately scrollable (having dedicated scroll functions). Another way a user may obtain ordered views of activity is by using a traditional drop-down menu approach as is illustrated in this example by a drop-down menu 1307. In this case an activity summary view was ordered and displayed as information 1306 and upon further manipulation, 1306. However, other ordered views are possible and should not be limited to views of all messages, specified zone views, replicated activity, shared activity, timeline alerts, general alerts, and archived information.

To exemplify other possible views that can be formatted in various ways without departing from the spirit and scope of the invention, consider a zone view of a specific zone. A user may click option Zones from menu 1307 and receive an iconic representation of all of the current zones. By clicking on a detail icon associated with any listed zone, a user may receive a detailed architecture (tree portion) specific to that zone showing the inboxes and folders of the zone. Such detail may be presented for display in workspace 1305. If desired, a user may further order detail by selection of an option, provided for the purpose, for viewing activity for that zone. Selecting the option view activity may then enable the user to browse through the inbox messages and folder contents for the selected zone. Therefore, all of the function provided through navigation of tree 1303 is, in this example, replicable through other functional means such as by manipulating menu 1307. Moreover, mouse over and right clicking on options can also provide a means to drill down to detail in zone inboxes and folders.

One with skill in the art of various network-capable devices will appreciate that interface 1300 may both visually and functionally appear differently according to device type, access protocol, and supported media types without departing from the spit and scope of the present invention. In one embodiment, for example, a user may access his or her portal page 1300 using a standard telephone and negotiate available option through such as IVR interaction.

A view of replicated activity selected from menu 1307 may bring up a workspace 1304 containing activity information similar in structure to activity information 1306 accept that new messages that were not replicated would not be displayed. Selection of the option shared may call up a workspace wherein all shared components like shared inboxes and folders are displayed. Moreover, shared contact directories can also be viewed through this option.

In one embodiment of the present invention a view for time alerts can be ordered by selection the option Time Alerts in menu 1306. In this case workspace 1304 may indicate the existence of any time sensitive activity across all zones. A user may pre-configure certain correspondence threads identified by contact and user identity, for example, as time sensitive correspondence. In this case the timeline related to the receipt of and reply to messages of thread can be displayed along with the message activity summary. In this way a user may be alerted if, for example, if a time window for responding to the latest received message is approaching or exceeding a pre-specified time allotted for response to certain types of messages, or to a threshold time window established a particular correspondence thread involving one or more contact identities. A time alert may be displayed to a user at any time whether or not a timeline view is ordered. Such alerts may appear as pop-up alerts or on an alert bar provided for the purpose.

In one embodiment of the present invention an administrative control-view option (not illustrated) may be provided for enabling an administrator to access zone architecture and apply certain service levels to specific zones or zone activities specific to zones or across multiple zones. For example, if a zone architecture reflects a hosted business environment where users might be sales agents sharing zones and/or inboxes and folders, administrative response time rules may be applied for outgoing communiqués that are in response to client requests for information or service. In such an embodiment a response rule for purchase order requests queued in an inbox in an offered products zone might be "respond to all request within 2 hours of queue time" whereas a response rule for customer service in a customer care zone might be "respond within 8 hours of queue time". An administrator may order a service view, for example, across zones to analyze how well agents are performing.

The same embodiment immediately described above can be extended to a non-business or family-oriented zone architecture having shared activity. In this case the administrator could be a parent and response rules can be applied to one or more family shared inboxes to insure that members of the family respond to certain messages in an appropriate time. For example if a grandmother sends an email to a son, it is socially important that the son respond to the grandmother in a reasonable amount of time out of respect. Likewise if a son or daughter is involved in a collaborative school project, it is important that communiqués received from peers involved in the project are addressed in a responsible time frame. There are many possibilities.

General alerts can be generated and displayed for users at any time while a user is logged in to the portal system. Alerts related to zone policy violations and other administrative alerts related to account status and so on may be considered general alerts. By selecting view alerts option in menu 1307, the user can view all zone policy and other alerts generated since the last login. A user may also order views of archived information by selecting Archived from menu 1307. Such views ordered can be zone specific views or views across all hosted zones.

Portal interface 1300 has an interaction mode option 1310 that allows a user to set interaction status according to presence information. For example, an option Live can be selected if a user wishes to accept live interaction while logged into portal page 1300. An away icon is provided to indicate presence information that the user is logged in and currently away. If a user activates the Live option, he or she can accept live calls, instant messaging, and so on through the portal interface with all interaction conforming to zone policy enforced by firewall as described further above.

In one embodiment a user may be defined as a business of multiple users or agents having multiple hosted zones and identities. Live interaction in this case may be a default state for a business having all communication routed to and from the business by proxy with incoming communication routed to appropriate user or agent inboxes and identified telephony extinctions and outgoing communications routed to destinations in a zone and identity specific manner. In the case of hosting a business, portal page 1300 can be provided in multiple instances for the agents that are receiving service. An example would be for multiple agents accessing the server simultaneously from a LAN network of connected devices. A very large business with many agents might have a separate portal server dedicated to hosting the business.

A user may elect to operate off-line or not hosted for periods of time wherein hosting services are not used. In this case it is assumed that the user has zone architecture and policy installed locally so that when next online the activity can be replicated or synchronized with the hosted architecture. In the case of live interaction, telephone numbers and extensions can be published in the telephone network at one or more local CTI switches maintained by or leased by the hosting service. IVR services and other telephone network services can be similarly provided and maintained and or provided and leased by the zone host and adapted to cooperate with the portal system so that during live interaction where hosting is performed, incoming and outgoing communications are conducted according to zone policy and identities. One such example might be a contact calling a client where the contact uses a business telephone number to reach the client. An IVR service can be used to identify the contact and purpose of the call. Automatic number identification (ANI) and destination number identification service (DNS) as well as IVR prompting can be used to properly identify the contact identity. The destination number can be assigned to one or more zone-specific user identities including telephone extensions, IP addresses, message boxes, and so on. The host then using the identity-oriented firewall performs the final destination routing to the appropriate live extension or application on the local station of the client (if live) or to the appropriate message inboxes and folders (if away).

It will be apparent to one with skill in he art that interface 1300 can have many function variations and view possibilities without departing from the spirit and scope of the present invention. Interface 1300 may be customized for a single client or a client defined by multiple users.

The methods and apparatus of the present invention provide a unique capability of managing communication and digital collection according to multiple client and contact identities, which can be personalized according to a variety of zone descriptions. The invention can be implemented with or without zone hosting capabilities and can tie virtually any communication media to zone architecture enforced by zone policy. The methods and apparatus of the present invention empower a user in constructing a social communication environment that successfully excludes undesired communication and provides convenience and security in communication management for a client or client group of individuals.

In accordance with the many and varied embodiments described in this specification, the methods and apparatus of the claimed invention should be afforded the broadest interpretation. The methods and apparatus of the invention should be limited only by the following claims.

What is claimed is:

1. A communication management system, comprising: a computer appliance associated with a particular user;
   a data repository coupled to the computer appliance storing a directory of contact identities;
   a zone manager enabling the user to create one or more zones defined each by a business or a social activity, to associate specific contact identities with individual ones of the zones created, and to create management policies associated with and specific to each zone created; and
   an identity/zone firewall, comprising an identity analyzer analyzing and validating identities detected, the firewall acting as an enforcer of management policies and serving as a gateway at the computer appliance through which incoming and outgoing communications pass;
   wherein individual incoming or outgoing communications are associated at the identity/zone firewall with a zone, by one or both of identities of sender and receiver and message content, and the management policies specific to that zone are enforced before the communications are allowed to pass.

2. The system of claim 1 wherein contact identities may be names or aliases of persons or devices.

3. The system of claim 1 further comprising an interface to a network, wherein the communication involves sending or receiving messages over the network.

4. The system of claim 1 wherein messaging in multiple modes and protocols is supported, including but not limited to voice and text.

5. The system of claim 1 wherein contact identities of single users or devices may vary by communication mode as well as by zone.

6. The system of claim 4 wherein the multiple modes and protocols include email, instant messaging, RSS, voice mode, network-news transport protocol (NNTP), file transport protocol (FTP), really simple syndication (RSS), universal discovery description and integration (UDDI), lightweight directory access protocol (LDAP), multipurpose internet mail extensions (MIME, post office protocol (POP), simple mail transport protocol (SMTP), Internet message access protocol (IMAP), session initiation protocol (SIP), text messaging services (TMS), and hypertext transport protocol (HTTP).

7. The system of claim 1 wherein contact identities include both sender and recipients.

8. The system of claim 1 further comprising alerts generated from attempted policy violation.

9. The system of claim 2 wherein contact identity may be in a form of a URI, an email address, a telephone number, a machine address, an IP address, or a text messaging address.

10. The system of claim 1 wherein management policy includes automatic handling of incoming and outgoing communication events, the handling determined by one or both of contact identity and mode of communication.

11. The system of claim 1 further comprising an interactive user interface for a user to create and populate zones, enter contact identities and create, edit, and associate policy.

12. A method for communication management, comprising the steps of:
   (a) creating by a user at a computer appliance associated with that user, using a zone manager software, a plurality of message zones each defined by a business or by a social activity of that user;
   (b) creating by the user, using the zone management software, a plurality of management policies and associating at least one management policy with each zone created;
   (c) associating by the user, using the zone-management software, specific contact identities with individual ones of the zones created;
   (d) intercepting incoming and outgoing communications at an identity/zone firewall, comprising an identity analyzer analyzing and validating identities detected, the firewall at the computer appliance through which communications must pass;
   (e) determining zone for intercepted communications by one or both of identities of sender and receiver and message content; and
   (f) enforcing whatever management policy is associated with the determined zones before the communications are allowed to pass.

13. The method of claim 12 contact identities may be names or aliases of persons or devices.

14. The method of claim 12 further comprising a step for routing the message via one or more network interfaces according to zone and management policy.

15. The method of claim 12 wherein messaging in multiple modes and protocols is supported, including but not limited to voice and text.

16. The method of claim 12 wherein contact identities may vary by communication mode as well as by zone.

17. The method of claim 16 wherein the multiple modes and protocols include email, instant messaging, RSS, and voice mode.

18. The method of claim 12 wherein contact identities include both sender and recipients.

19. The method of claim 12 further comprising generating alerts for attempted policy violation.

20. The method of claim 12 wherein a contact identity may be in a form of a URI, an email address, a telephone number, a machine address, an IP address, a text messaging address, network-news transport protocol (NNTP), file transport protocol (FTP), really simple syndication (RSS), universal discovery description and integration (UDDI), lightweight directory access protocol (LDAP), multipurpose internet mail extensions (MIME, post office protocol (POP), simple mail transport protocol (SMTP), Internet message access protocol (IMAP), session initiation protocol (SIP), text messaging services (TMS), and hypertext transport protocol (HTTP).

21. The method of claim 12 wherein management policy includes automatic handling of incoming and outgoing communication events, the handling determined by one or both of contact identity and mode of communication.

22. The method of claim 12 further comprising a step for creating and populating zones, entering contact identities, and creating, editing and associating policies.

* * * * *

UNITED STATES PATENT AND TRADEMARK OFFICE
CERTIFICATE OF CORRECTION

PATENT NO. : 8,316,128 B2
APPLICATION NO. : 10/765338
DATED : November 20, 2012
INVENTOR(S) : Christopher Clemmett Macleod Beck et al.

Page 1 of 1

It is certified that error appears in the above-identified patent and that said Letters Patent is hereby corrected as shown below:

In the Specification

Col. 1, line 8 insert

--Cross Reference to Related Documents

The present patent application refers to Document Disclosure number 534,495, entitled "Agent Product Road Map," which was assigned a filing date of July 8, 2003, and which is incorporated herein in its entirety.--

Signed and Sealed this
Second Day of July, 2013

Teresa Stanek Rea
*Acting Director of the United States Patent and Trademark Office*